United States Patent
Wannier et al.

(10) Patent No.: US 7,617,016 B2
(45) Date of Patent: Nov. 10, 2009

(54) COMPUTER SYSTEM FOR RULE-BASED CLOTHING MATCHING AND FILTERING CONSIDERING FIT RULES AND FASHION RULES

(75) Inventors: Louise Wannier, Pasadena, CA (US); James P. Lambert, Toluca Lake, CA (US)

(73) Assignee: myShape, Inc., Glendale, CA (US)

( * ) Notice: Subject to any disclaimer, the term of this patent is extended or adjusted under 35 U.S.C. 154(b) by 0 days.

(21) Appl. No.: 11/697,688

(22) Filed: Apr. 6, 2007

(65) Prior Publication Data

US 2007/0198120 A1 Aug. 23, 2007

Related U.S. Application Data

(63) Continuation-in-part of application No. 11/412,321, filed on Apr. 26, 2006, now Pat. No. 7,398,133.

(60) Provisional application No. 60/779,300, filed on Mar. 6, 2006, provisional application No. 60/676,678, filed on Apr. 27, 2005.

(51) Int. Cl.
*G06F 19/00* (2006.01)
(52) U.S. Cl. .............................. 700/132; 705/26; 705/27
(58) Field of Classification Search ................. 700/130, 700/131, 132, 135; 705/26, 27; 707/3, 4, 707/6, 104.1
See application file for complete search history.

(56) References Cited

U.S. PATENT DOCUMENTS

| | | | |
|---|---|---|---|
| 4,149,246 A | 4/1979 | Goldman | |
| 4,539,585 A | 9/1985 | Spackova et al. | |
| 5,163,007 A | 11/1992 | Slilaty | |
| 5,495,568 A | 2/1996 | Beavin | |
| 5,515,248 A | 5/1996 | Canfield et al. | |
| 5,551,021 A | 8/1996 | Harada et al. | |
| 5,680,528 A | 10/1997 | Korszun | |
| 5,724,522 A | 3/1998 | Kagami et al. | |
| 5,757,661 A | 5/1998 | Surville | |
| 5,850,222 A | 12/1998 | Cone | |
| 5,930,769 A | 7/1999 | Rose | |
| 5,937,081 A | 8/1999 | O'Brill et al. | |
| 5,970,471 A | 10/1999 | Hill | |
| 5,974,400 A | 10/1999 | Kagami et al. | |
| 6,546,309 B1 | 4/2003 | Gazzuolo | |

(Continued)

*Primary Examiner*—Gary L Welch
*Assistant Examiner*—Nathan E Durham
(74) *Attorney, Agent, or Firm*—Philip H. Albert; Townsend and Townsend and Crew, LLP

(57) ABSTRACT

A computer implemented method presents garments to a consumer using a computer by reading a database of garments, wherein the database of garments includes parameters for at least some of the garments represented by records in the database of garments, the parameters including at least a garment type, reading data representing a plurality of garment types, the data including, for each type of the plurality of garment types, a set of tolerance ranges for that garment type, obtaining consumer measurements from the consumer or a source derived from the consumer, obtaining garment measurements for garments in the database of garments, comparing customer measurements to garment measurements, scoring garments from the database of garments based on garment measurements, customer measurements and the set of tolerance ranges for each garment based on its garment type, and presenting the consumer with a computer generated filtered listed of garments from the database of garments ordered, at least approximately, according to garment scores.

12 Claims, 19 Drawing Sheets

U.S. PATENT DOCUMENTS

| | | |
|---|---|---|
| 6,665,577 B2 | 12/2003 | Onyshkevych et al. |
| 6,711,455 B1 | 3/2004 | Holloway et al. |
| 6,968,075 B1 | 11/2005 | Chang |
| 7,020,538 B2 | 3/2006 | Luhnow |
| 7,092,782 B2 | 8/2006 | Lee |
| 7,194,327 B2 | 3/2007 | Lam |
| 2002/0004763 A1 | 1/2002 | Lam |
| 2002/0103566 A1 | 8/2002 | Gadson |
| 2002/0138170 A1 | 9/2002 | Onyshkevych |
| 2002/0178072 A1 | 11/2002 | Gusler et al. |
| 2002/0188372 A1 | 12/2002 | Lane et al. |
| 2004/0186611 A1 | 9/2004 | Wang |
| 2005/0022708 A1 | 2/2005 | Lee |
| 2006/0031128 A1 | 2/2006 | Lamitie |
| 2006/0059054 A1 | 3/2006 | Adiseshan |
| 2006/0218045 A1 | 9/2006 | Wagner |

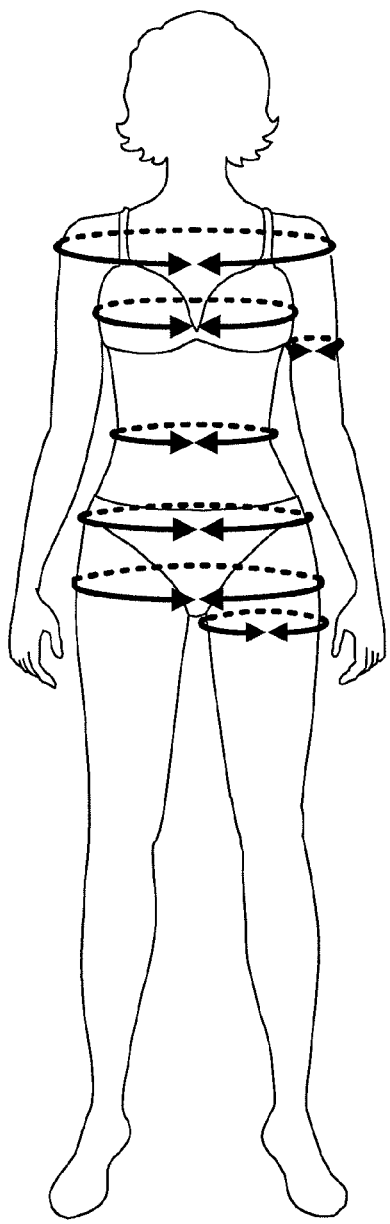

Circumference Measurements

_____ Shoulder
_____ Bust
_____ Waist
_____ High Hips
_____ Hips
_____ One Thigh
_____ Upper Arm Measure the CIRCUMFERENCE of your body at various points.

Shoulders: Measure around shoulders, just below the shoulder joint, going outside your arms at the widest point.
Bust: Measure bust at fullest point and straight across back.
Waist: Measure around torso at your waistline.
High Hips: Measure over top of hip bones, 2"-4" below waist.
Hips: Measure at the fullest part, usually 7"-9" from waist.
One Thigh: Measure at the fullest part of one thigh on one leg (your choice).
Upper Arm: Measure the circumference of the thickest part of your upper arm (that bicep muscle!)

FIG. 4A

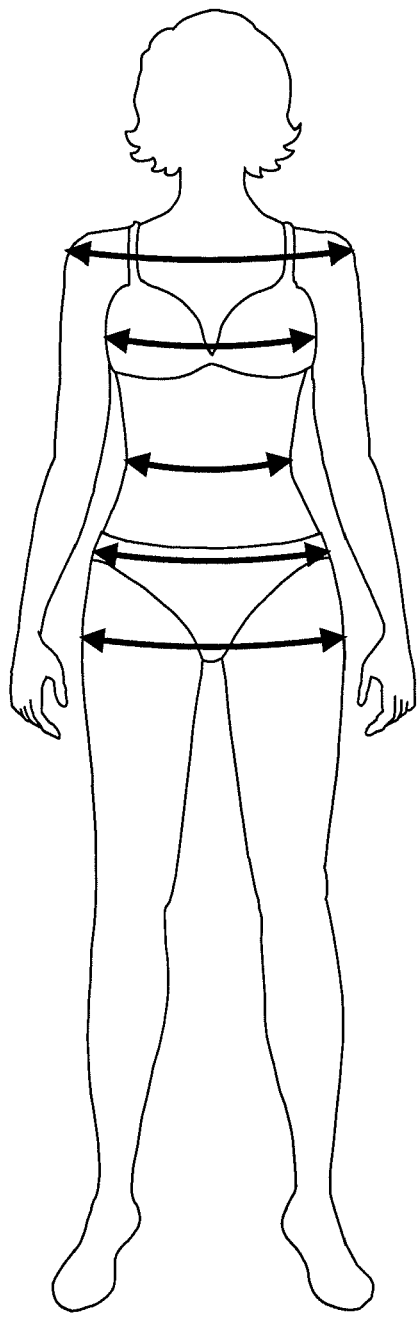

Front Measurements

_____ Shoulder
_____ Bust
_____ Waist
_____ High Hips
_____ Hips

Measure the FRONT OF YOU from the middle of one side to the middle of the other only. It helps if you are wearing lightweight, form fitting clothes with side seams to help locate the side of your body Front of Shoulders: Measure from mid point of upper arm just below the shoulder joint to the same point of the opposite side, crossing the front of your body.
Front of bust: Measure from as close to middle of one side of your body to the middle of the other crossing over the fullest part of your bust.
Front of Waist: Measure from middle of one side to the middle of the other at your waist.
Front of High Hips: Measure over top of hip bones, 2"-4" below waist.
Front of Hips: Measure from the middle of one side to the middle of the other at the fullest part of your hips, usually 7"-9" from waist.

FIG. 4B

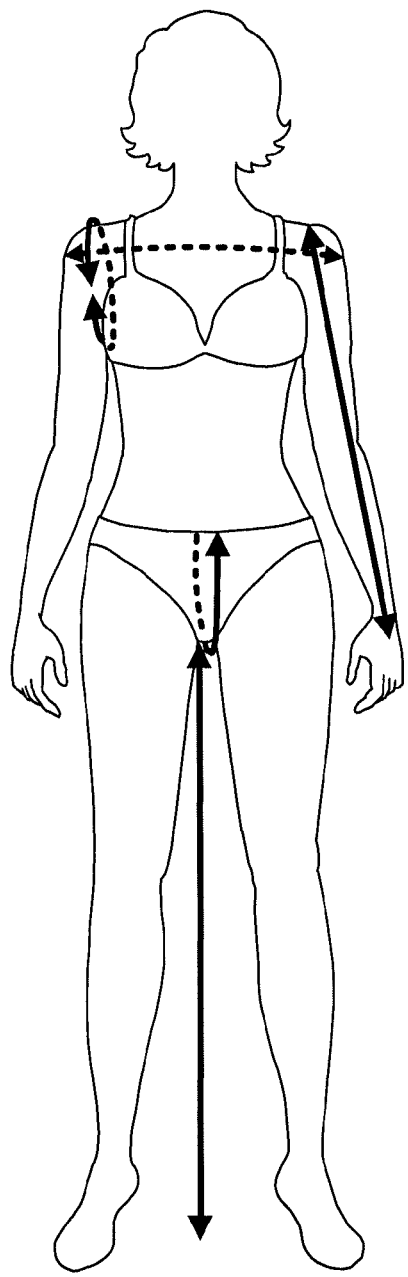

Additional Measurements

_____ Across upper back
_____ Arm hole circumference
_____ Arm length
_____ Rise (of pants)
_____ Inseam (Leg length)

Almost done, just a few more!

Across upper back: Measure across your upper back from end of shoulder joint to end of shoulder joint. Or, for a shortcut, use a favorite jacket, measuring from shoulder seam to shoulder seam.
Arm hole circumference: Measure top of should under arm and back around to the top of the arm.
Arm length: Measure from the middle of the shoulder joint to the wrist joint, with slightly bent elbow.
Rise (of pants): Start at middle for your waist in back, pass tape measure between your legs and up to the middle of your waist in front. Do not pull tight on this measurement, and don't make it too loose. Keep comfort in mind and make sure you are measuring your body accurately. A shortcut is to measure your favorite pair of pants.
Inseam (leg length): Measure from the crotch to the floor on the inside of your leg. Or, for a shortcut, measure the inseam of your favorite pair of pants.

FIG. 4D

Match Assessment for a fitted dress

Measurement Filter 232

*Height Comparisons*

900

③
↓
Calculate the difference between the Consumer's Shoulder Height and the Garment's Shoulder to Hem — 902
↓
Is the difference less than the Consumer Knee Height plus Garment's Length? — 904 — NO →
↓ YES
Calculate the difference between the Consumer's Shoulder Height and the Consumer's Waist Height — 906
↓
Is the difference less than the Garment's Shoulder to Waist? — 908 — NO →
↓ YES

*Sleeve Comparisons*

↓
Is the Consumer's Armhole Circumference less than or equal to the Garment's Armhole Circumference? — 910 — NO →
↓ YES
Is the Garment Sleeve Length - Garment Sleeeve Tolerance - Consumer's Arm Length <= zero? — 912 — NO →
↓ YES → Discard to Bin D 239 'Don't Display' — 922

Match Assessment for a fitted dress

Shape Code Filter 236                                                        1300

Example Output of Match Assessment

1400

Holding Bins
7 Shape Bins with
prioritized garments

238

| 1 | | 2 | | 3 | | 4 | | 5 | | 6 | | 7 | |
|---|---|---|---|---|---|---|---|---|---|---|---|---|---|
| *1001* | 0 | 7374 | 0 | 3566 | 4 | 23 | 0 | *1001* | 0 | 96 | 1 | 1065 | 0 |
| 1098 | 0 | 5633 | 0 | 4123 | 4 | 776 | 0 | 76 | 0 | 112 | 1 | 3676 | 2 |
| 4567 | 0 | 876 | 1 | 7234 | 8 | 4321 | 0 | 2467 | 0 | 3989 | 1 | 53 | 6 |
| 986 | 0 | 278 | 2 | 9875 | 8 | 706 | 0 | 9009 | 5 | 5155 | 1 | 342 | 6 |
| 916 | 0 | 9998 | 2 | 8887 | 8 | 4997 | 0 | 3421 | 5 | 6341 | 1 | 4088 | 6 |
| 671 | 3 | 6543 | 6 | 4309 | 9 | 2156 | 3 | 6540 | 8 | 6340 | 2 | 5115 | 6 |
| 9643 | 3 | 2345 | 6 | 1280 | 9 | 223 | 3 | 6669 | 8 | 6342 | 2 | 7689 | 7 |
| 1102 | 5 | 1234 | 6 | 478 | 12 | 986 | 5 | 848 | 9 | 7867 | 2 | 4024 | 7 |
| 234 | 6 | 785 | 7 | 978 | 12 | 4044 | 6 | 959 | 9 | 7543 | 4 | 8309 | 9 |
| 1098 | 7 | 9008 | 7 | 5111 | 15 | 2776 | 7 | 595 | 9 | 426 | 4 | 4706 | 9 |
| 5278 | 8 | 8009 | 7 | 2390 | 16 | 5123 | 8 | 334 | 9 | 13 | 6 | 5182 | 9 |
| 9754 | 8 | 3123 | 8 | 7776 | 18 | 4356 | 8 | 2313 | 9 | 2347 | 6 | 9439 | 9 |
| 445 | 8 | 846 | 9 | 32 | 28 | 6690 | 8 | 8889 | 9 | 354 | 8 | 176 | 9 |

BEST ← first 5 rows

Garment ID

Priority code

FIG. 14

COMPUTER SYSTEM FOR RULE-BASED CLOTHING MATCHING AND FILTERING CONSIDERING FIT RULES AND FASHION RULES

CROSS-REFERENCE TO RELATED APPLICATIONS

The present disclosure may be related to the following commonly assigned applications/patents. This application is a continuation-in-part and claims priority from U.S. patent application Ser. No. 11/412,321, filed on Apr. 26, 2006, which in turn claimed the benefit of (1) U.S. Provisional Patent Application No. 60/676,678, filed Apr. 27, 2005, entitled "A Method for Specifying the Fit of Garments and Matching the Fit of Individual Garments to Individual Consumers Based on a Recommendation Engine", and (2) U.S. Provisional Patent Application No. 60/779,300, filed Mar. 6, 2006, entitled "Method of Specifying the Fit of Garments and Matching the Fit of Individual Garments to Individual Consumers Based on a Recommendation Engine (combining measurements, preferences and body shape process)". The respective disclosures of these applications/patents are incorporated herein by reference in their entirety for all purposes.

FIELD OF THE INVENTION

The present invention relates to computer systems for providing consumer access to databases of clothing items and in particular to computer systems that programmatically match clothing items with individual consumers' data, possibly including searching, sorting, ranking and filtering database items.

BACKGROUND OF THE INVENTION

As more and more consumers rely on electronic online access to information about products for purchase, more and more merchants will need to consider providing electronic access to information about goods and services available to those consumers. In a typical electronic commerce situation, a merchant compiles a database of their products and/or services, possibly including information about each product (size, color, type, description, price, etc.). Then the merchant provides consumers with an external electronic interface to that database, such as through a Web server, giving access to those consumers with Internet connectivity on their computers, computing devices, or telecommunication devices. Consumers can then review the merchant's available offerings, select items of interest, and even order them by interacting with the merchant's interface (e.g., selecting items and quantities, arranging for payment, arranging for delivery, etc.).

Online shopping is more remote and less physical than in-person shopping, as computers and computer displays are limited in what they can provide to the potential consumer. For example, the consumer will not be able to feel, smell, hold or manipulate the actual product being ordered. These shortcomings are not an issue where the consumer knows the product and it is unchanging. For example, when the consumer is ordering a specific book by title known to the consumer or a familiar bag of pet food, all the consumer really needs is minimal information, and possibly a photo of the item, to ensure that they are ordering the specific item they had in mind. However, with some other classes of goods, online ordering has been somewhat limiting.

For example, when ordering items of clothing, online shopping has significant limitations. For one, because consumers rarely buy the exact same article of clothing over and over, they often do not have specific clothing items in mind while shopping, such as a particular brand, size, color, etc. of pants. More typically, a consumer is purchasing some item of clothing he or she does not already have an exact copy of, so there may be a question of how that item might fit and look when worn by that consumer.

With some clothing items, fit can be inferred from a description. For example, the fit for a belt that is 38 inches long and one inch wide might be inferred from that description alone. However, for other items, such as a dress, fit might not be so straightforward and in some cases, the best approach is for the consumer to physically have the item and try it on, which is impossible with online shopping. Another difficulty is the wide variety of clothing items that can include garments, accessories, shoes, belts, etc. The complexity of online shopping is further compounded for the consumer trying to assemble an outfit, that is, a set of two or more clothing items intended to be used or worn together.

A number of approaches have been tried to bridge the gap between online shopping for clothing items and having the item in hand to try on.

One approach is to take measurements from the consumer, assume other measurements, and then custom make the desired clothing item according to tailoring assumptions and/or standard models. Because of the wide variety of human body shapes and garment types this may work well for some people but not others.

Another approach is to have clothing items represented by geometric models: scan an image of the consumer (or the consumer herself), and then use computer graphics techniques to generate a combined image of the consumer and a geometric model of a garment in an attempt to show a simulation of how that consumer might look, if she were actually wearing that garment. Such an approach takes time and might require the consumer to "virtually" try on a great many clothing items—one after another.

Online apparel shopping results in greater percentages of returns compared with purchases made at a physical store. Most of the return rate for women's clothing sold in the U.S. is due to size and fit problems.

One cause of fit problems is a lack of standards. The U.S. Department of Commerce withdrew the commercial standard for the sizing of women's apparel in 1983, and since then clothing manufacturers and retailers have repeatedly redefined the previous standards or invented their own proprietary sizing schemes. The garment size for an individual often differs from one brand of apparel to another and from one style to another. This is commonly seen with women's clothing. A dress labeled "size 10" of a particular style from one manufacturer fits differently than a size 10 from another manufacturer or perhaps even a different style from the same manufacturer. One may fit well, the other not at all. Even within a single size from a single manufacturer, there can be fit problems caused by the wide variation in consumers' body shapes. Consumers typically must try on multiple garments before finding and buying one that fits.

There are more than 5,000 designers and each of them might use a particular body fit model that represents a different body proportion and change these models from season to season and style to style. Thus, what fits changes based on designer, style of garment, season, and can also change with different fabrics and weaves and washes.

The lack of sizing standards combined with unreliable labeling cause apparel fit problems, which in turn cause a very high rate of apparel returns, lost sales, brand dissatisfaction, time wasted in fitting rooms, and intense consumer frustration. The problems are only compounded when consumers attempt to make clothing purchases online instead of trying on actual clothing items in a bricks-and-mortar store.

Another attempt to deal with these problems involves analyzing a wide range of a market population and then designing a range of body shapes and designs for a particular garment based on that population. For example, manufacturers might be directed to produce several shapes of a particular pant to offer different fit choices in pants given what the population for the market for such pants is estimated at. The problem is that this approach still relies on the trial and error of locating that pant and determining individually whether it is a good match.

Improved methods and apparatus are needed.

BRIEF SUMMARY OF THE INVENTION

In embodiments of computer-implemented methods for matching fit and fashion of individual garments to individual consumers according to the present invention, a server system accessible to users using client systems can match consumers with garments and provide an improved, online, clothes shopping system, where a consumer is presented with a personalized online clothing store, wherein the consumer using a consumer client system can browse a list of garments matching the consumer's dimensions, body shape, preferences and fashion needs, wherein the garments are also filtered so that those shown also match fit and fashion rules so that selected garments have a higher probability of both fitting and flattering.

A computer implemented method may present garments to a consumer using a computer by reading a database of garments, wherein the database of garments includes parameters for at least some of the garments represented by records in the database of garments, the parameters including at least a garment type, reading data representing a plurality of garment types, the data including, for each type of the plurality of garment types, a set of tolerance ranges for that garment type, obtaining consumer measurements from the consumer or a source derived from the consumer, obtaining garment measurements for garments in the database of garments, comparing customer measurements to garment measurements, scoring garments from the database of garments based on garment measurements, customer measurements and the set of tolerance ranges for each garment based on its garment type, and presenting the consumer with a computer generated filtered listed of garments from the database of garments ordered, at least approximately, according to garment scores.

The scores can take into account customer preferences determined based on customer inputs. Garment type and the set of tolerance ranges might be determined by input from a fashion expert. The filtering might be done using thresholds on scores.

The clothes shopping system can be a computerized implementation of a consumer-garment matching method. In specific embodiments, the consumer-garment matching method comprises up to four processes: definition, categorization, match assessment, and personalized shopping.

A definition process comprises defining: a) human body shapes, b) human body heights, c) garment types, d) fit rules, and e) fashion rules. In one specific embodiment, seven body shapes are defined, six body heights are defined, sixteen garment types are defined, and a plurality of fit rules and fashion rules are defined. Each definition may include a plurality of data points, formulae, tolerances and/or tolerance ranges. The resultant definitions can be stored in computer database tables or similar data structures.

A categorization process allows for the collection of individual consumer records and individual garment records into computer databases. A consumer record describes an individual consumer, including his or her body measurements and personal profile, e.g., clothing preferences (such as fabric color), preferred tolerances (such as snugness of fit), and the like. The process can categorize the consumer by body shape and height, and assign to the consumer's record a corresponding shape code and a corresponding height code, wherein the codes represent a specific one of such shapes or body height bins. A garment record describes an individual garment, including its measurements and profile, e.g., its color, fabric, tolerances, etc. Garments can be categorized by body shape, which is assigned to a garment record in the form of the corresponding shape code or codes. Additionally, garments can also be categorized by garment type, and a garment type code stored in the garment's garment record.

A match assessment process compares a consumer's record to one or more garment records and produces a scored, sorted and filtered list of matching garments. In one specific embodiment, when conducting a consumer-to-garment comparison, the match assessment process applies a series of three filters: the measurement filter, the profile filter and the shape code filter. The measurement filter uses fit rules with tolerances to compare a consumer's measurements to a garment's measurements in order to determine if the garment would physically fit the consumer at various critical measurement points, taking into account the desired fit from the design's perspective and the consumer's desired fit.

The measurement filter also computes a score (a "priority code"), indicating how well the garment fits the consumer. The profile filter uses fashion rules with tolerances to compare a consumer's profile and preferences with a garment's profile in order to determine if the garment suits and flatters the consumer and reflects the consumer's preferences for style and fit. The profile filter also computes the priority code score indicating how suitable the garment is for the consumer. The shape code filter compares the consumer's shape code with the garment's shape code(s) to determine if the garment's shape matches the consumer's body shape.

Finally, a personalized shopping process presents a filtered and ranked list of matching garments for recommendation to the consumer in an individually customized online shopping environment. Through this, the consumer's personalized store, the consumer may purchase recommended garments that have a high probability of fitting and flattering and suit the consumer's clothing preferences.

The following detailed description together with the accompanying drawings will provide a better understanding of the nature and advantages of the present invention.

BRIEF DESCRIPTION OF THE DRAWINGS

FIGS. 4A-D illustrate height and length measurement techniques, in accordance with described embodiments.

FIG. 5a shows a consumer recording process and FIG. 5b shows a garment recording process.

FIGS. 7-13 are flowcharts illustrating a match assessment process for a fitted dress, in accordance with described embodiments.

FIG. 14 is an illustration of example output from a match assessment process, in accordance with described embodiments.

These and other embodiments of the invention are described in further detail below.

DETAILED DESCRIPTION

An improved online clothes shopping system is described herein, where a consumer is presented with a personalized online store that lists clothing items for sale that are most likely to fit and flatter that particular consumer and match that consumer's preferences for style and fit. The presented list of items is generated by a computerized garment-consumer matching method that matches the fit and fashion of individual clothing items to individual consumers.

Clothing items are commonly thought to include garments (dresses, coats, pants, shirts, tops, bottoms, socks, shoes, bathing suits, capes, etc.), but might also include worn or carried items such as necklaces, watches, purses, hats, accessories, etc. In any of the following examples, sized and fitted garments are the items being shopped for, but it should be understood that unless otherwise indicated, the present invention may be used for shopping for other clothing items as well. As used herein, an outfit is a collection of two or more clothing items intended to be worn or used together.

In describing embodiments of the invention, female consumers and women's apparel will serve as examples. However, the invention is not intended to be limited to women's apparel as the invention may be used for various types of apparel including men's and children's apparel. Throughout this description the embodiments and examples shown should be considered as exemplary rather than limitations of the present invention.

In a matching process, garments and consumers are compared. For garments, the garment measurements, garment style/proportion and garment attributes (color, weave, fabric content, price, etc.) might be taken into account, while for the consumer, consumer measurements, consumer body proportion (such as shape code), and consumer fit and style and fashion preferences (how snug/loose, color, classic/contemporary/romantic, etc.), might be taken into account.

Fashion rules can be defined for various garment style(s) that suit a particular body proportion, both for garments and for outfits, including accessorizing. Fashion rules (programmatically defining fashion expertise) can be "overlaid" on the matches to recommend the best combinations that will fit and flatter. In this manner, a consumer might be presented with a large number of garments to choose from, but each would be more likely to be a "good choice", while leave out those garments that are less likely to fit or flatter. There could be a wide variety of garments and styles, etc., but organized as a personal store for that consumer.

Clothes Shopping System

Figure 1:
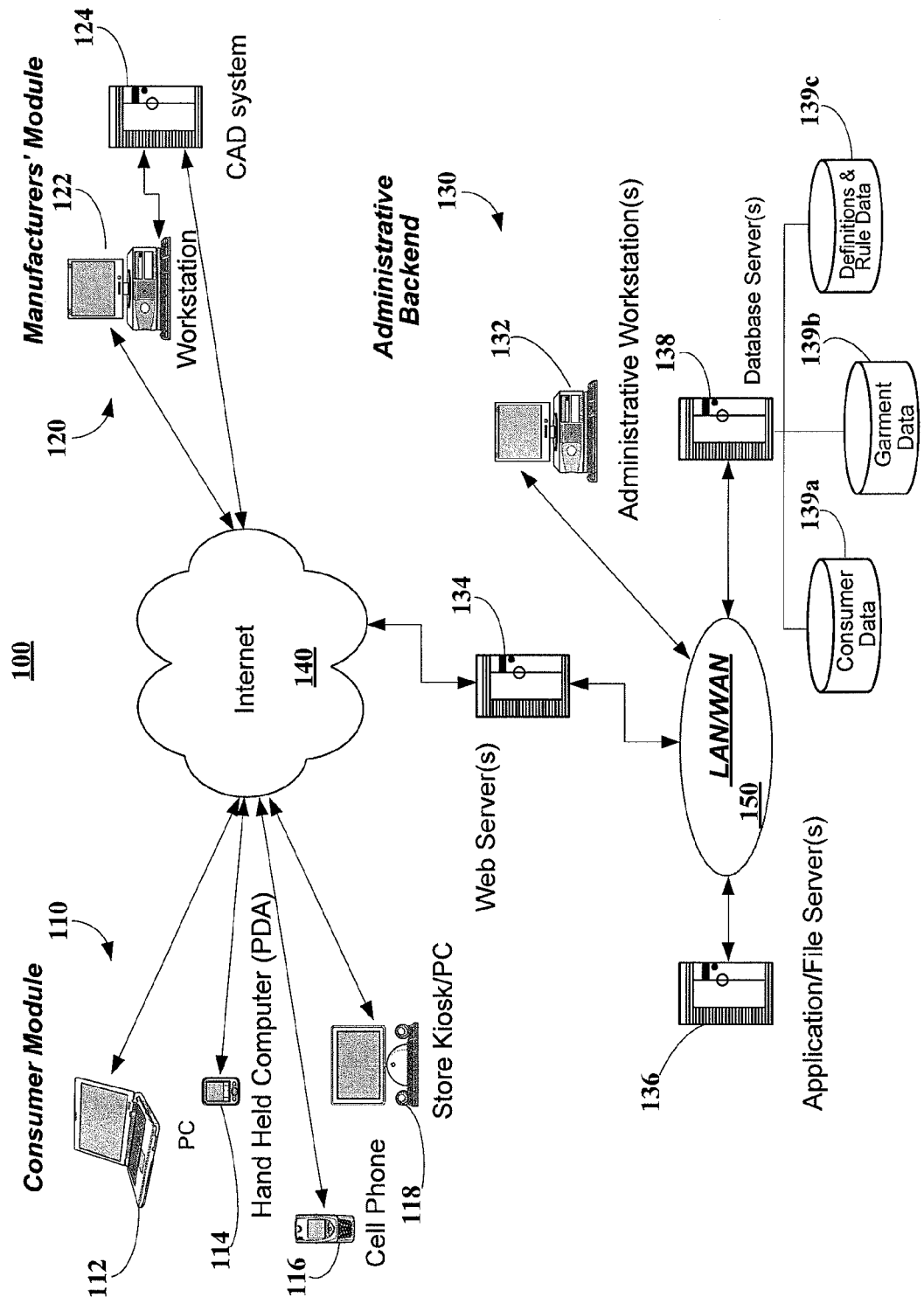
FIG. 1 is an illustration of a clothes shopping system, in accordance with described embodiments.

FIG. 1 is a high-level diagram depicting a clothes shopping system 100, which is a computer implementation of a consumer-garment matching method in accordance with one embodiment of the present invention. The clothes shopping system is a client-server system, i.e., an assemblage of hardware and software for data processing and distribution by way of networks, as those with ordinary skill in the art will appreciate. The system hardware may include, or be, a single or multiple computers, or a combination of multiple computing devices, including but not limited to: PCs, PDAs, cell phones, servers, firewalls, and routers.

As used herein, the term software involves any instructions that may be executed on a computer processor of any kind. The system software may be implemented in any computer language, and may be executed as compiled object code, assembly, or machine code, or a combination of these and others. The software may include one or more modules, files, programs, and combinations thereof. The software may be in the form of one or more applications and suites and may include low-level drivers, object code, and other lower level software.

The software may be stored on and executed from any local or remote machine-readable media, for example without limitation, magnetic media (e.g., hard disks, tape, floppy disks, card media), optical media (e.g., CD, DVD), flash memory products (e.g., memory stick, compact flash and others), Radio Frequency Identification tags (RFID), SmartCards™, and volatile and non-volatile silicon memory products (e.g., random access memory (RAM), programmable read-only memory (PROM), electronically erasable programmable read-only memory (EEPROM), and others), and also on paper (e.g., printed UPC barcodes).

Data transfer to the system and throughout its components may be achieved in a conventional fashion employing a standard suite of TCP/IP protocols, including but not limited to Hypertext Transfer Protocol (HTTP) and File Transfer Protocol (FTP). The eXtensible Markup Language (XML), an interchange format for the exchange of data across the Internet and between databases of different vendors and different operating systems, may be employed to facilitate data exchange and inter-process communication. Additional and fewer components, units, modules or other arrangement of software, hardware and data structures may be used to achieve the invention described herein. An example network is the Internet, but the invention is not so limited.

In one embodiment, a clothes shopping system 100 is comprised of three interconnecting areas: a consumer module 110, a manufacturer module 120, and an administrative backend 130, all operating in a networked environment that may include local and/or wide area networks (LAN/WAN) 150, and the Internet 140.

The administrative backend 130 uses administrator workstations 132, web servers 134, file and application servers 136, and database servers 138. The backend houses the consumer-garment matching software, the consumer and garment record databases 139a-139b, definition & rules database 139c, and the online store website with all of its necessary ecommerce components, such as Webpage generators, order processing, tracking, shipping, billing, email and security. Administrator workstations allow for the management of the entire system and all of its parts, including the inputting and editing of data.

The manufacturer module 120 uses software/hardware that allows a manufacturer to input data into the garment records that represent the garments the manufacturer makes. For example, for each garment of a particular size or SKU, a manufacturer enters the garment's dimensional measurements and profile data into the manufacturer module. This data may be entered manually via a workstation 122 or automatically by interfacing with the manufacturer's own internal systems, such as CAD systems 124 and PLM (product lifetime management) systems, and/or pattern making systems.

This inputted garment data might then be subjected to the garment categorization process 220, as described herein. Additionally, the module may provide the manufacturer with computed output from the system, such as the shape codes of their various garments. The manufacturer may now employ the system's output in his manufacturing process; for example, to print shape code(s) on a garment's label or sales tag, or to electronically embed part or all of a garment's record in its RFID tag.

The consumer module 110 is typically accessed by consumers via personal computers at home, school or office 112. The consumer module 110 may also be accessed through cellular phones 116, PDAs 114 and other networked devices, such as kiosks 118 in retail stores at malls, shopping centers, etc. It is through the consumer module 110 that a consumer can input her measurements, preferences and profile data into her consumer record. This inputted consumer data might then be subjected to the consumer categorization process 220, as described herein. And importantly, the consumer module enables the consumer to shop and buy at her personalized online clothes store.

Data such as consumer and garment records, that normally are input via the consumer and manufacturer modules, might also be input and edited via the administrative backend 130.

The Consumer-Garment Matching Method

Figure 2:
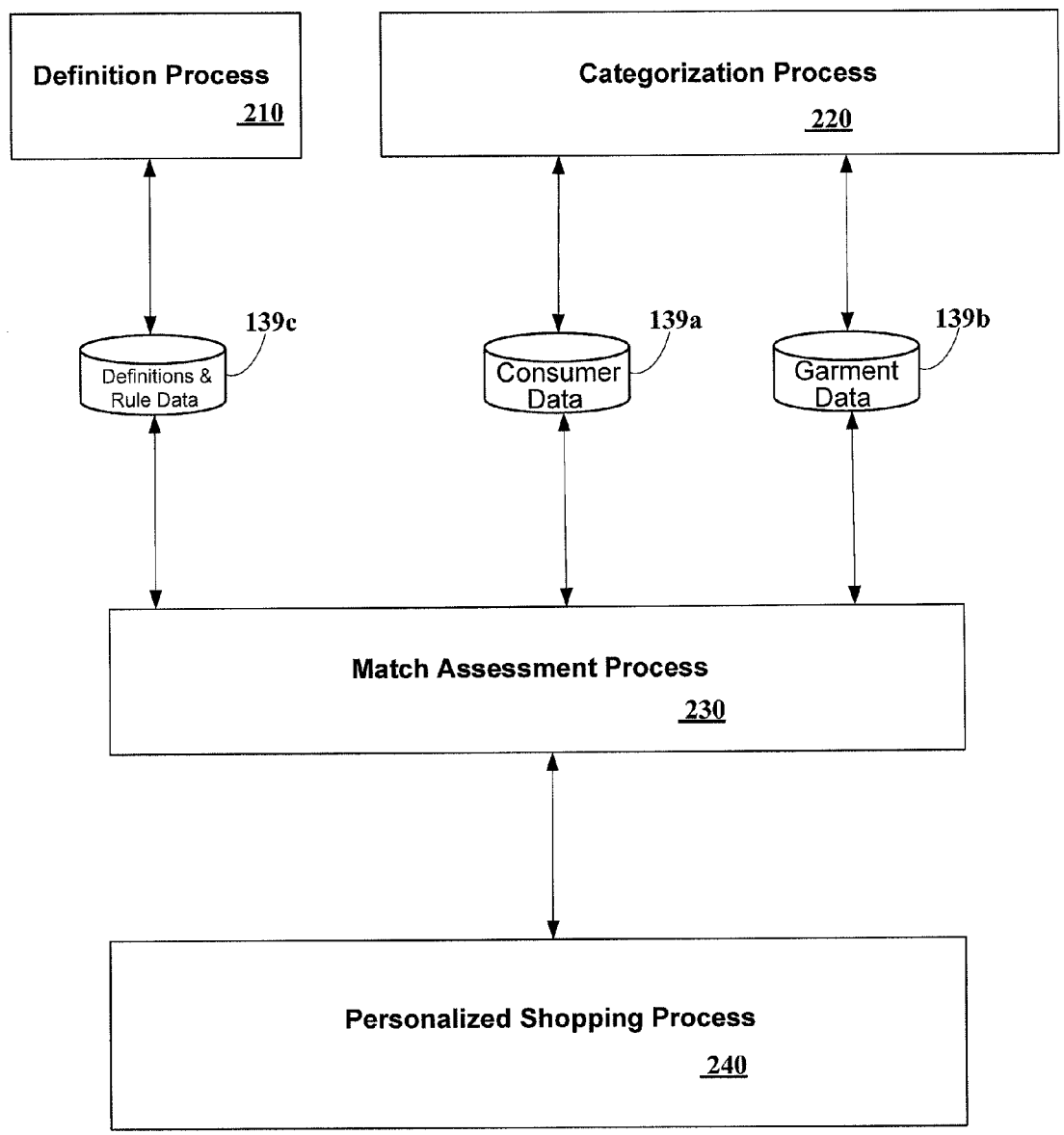
FIG. 2 is a simplified block diagram of a consumer-garment matching method, in accordance with described embodiments.

FIG. 2 is a simplified block-diagram depicting a consumer-garment matching method 200 and the data inputs, outputs and interdependence of its constituent processes: a definition process 210, a categorization process 220, a match assessment process 230, and a personalized shopping process 240, described herein.

Definition Process

Figure 3:
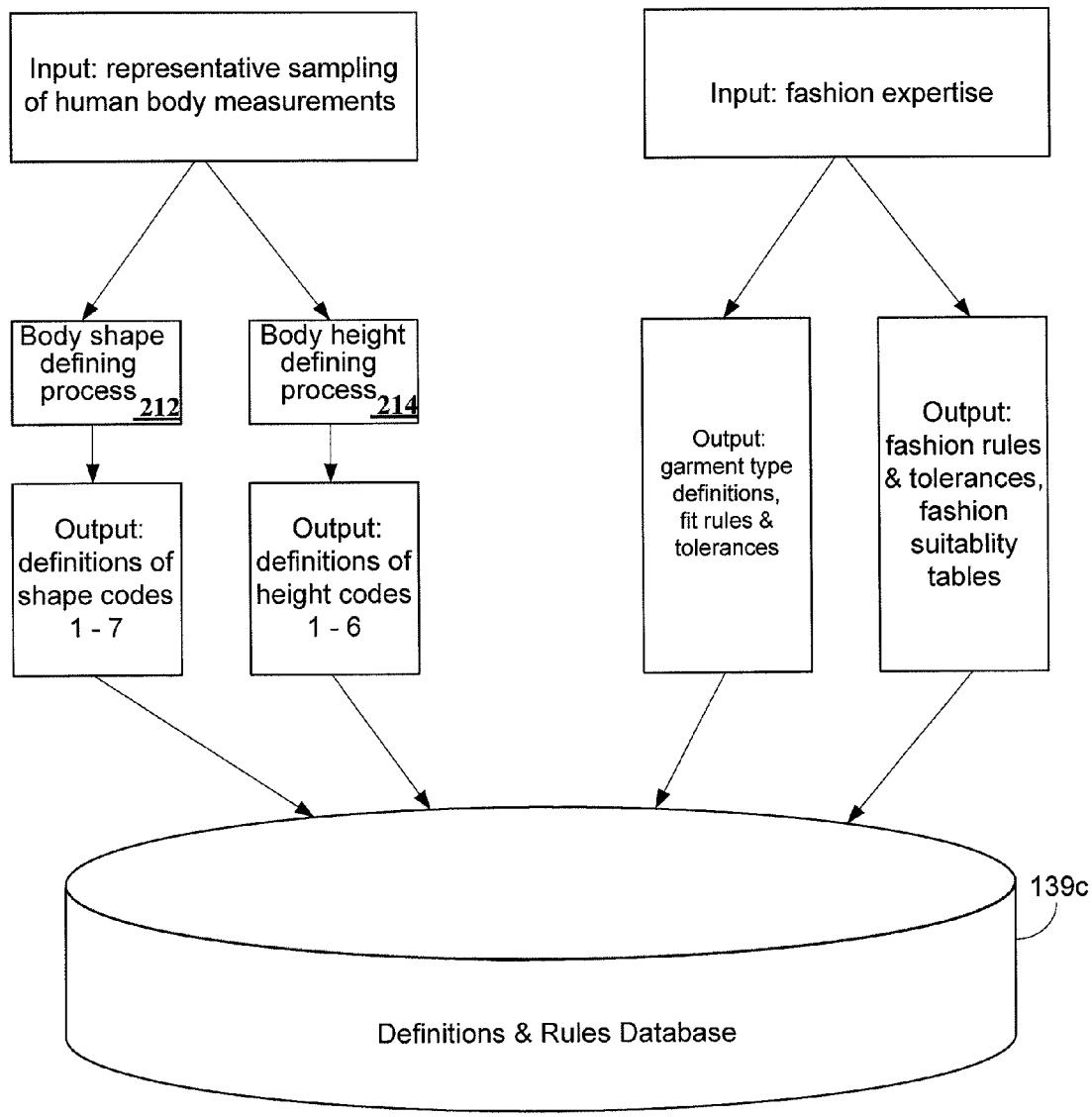
FIG. 3 is a simplified block diagram of a definition process, in accordance with described embodiments.
Figure 4C:
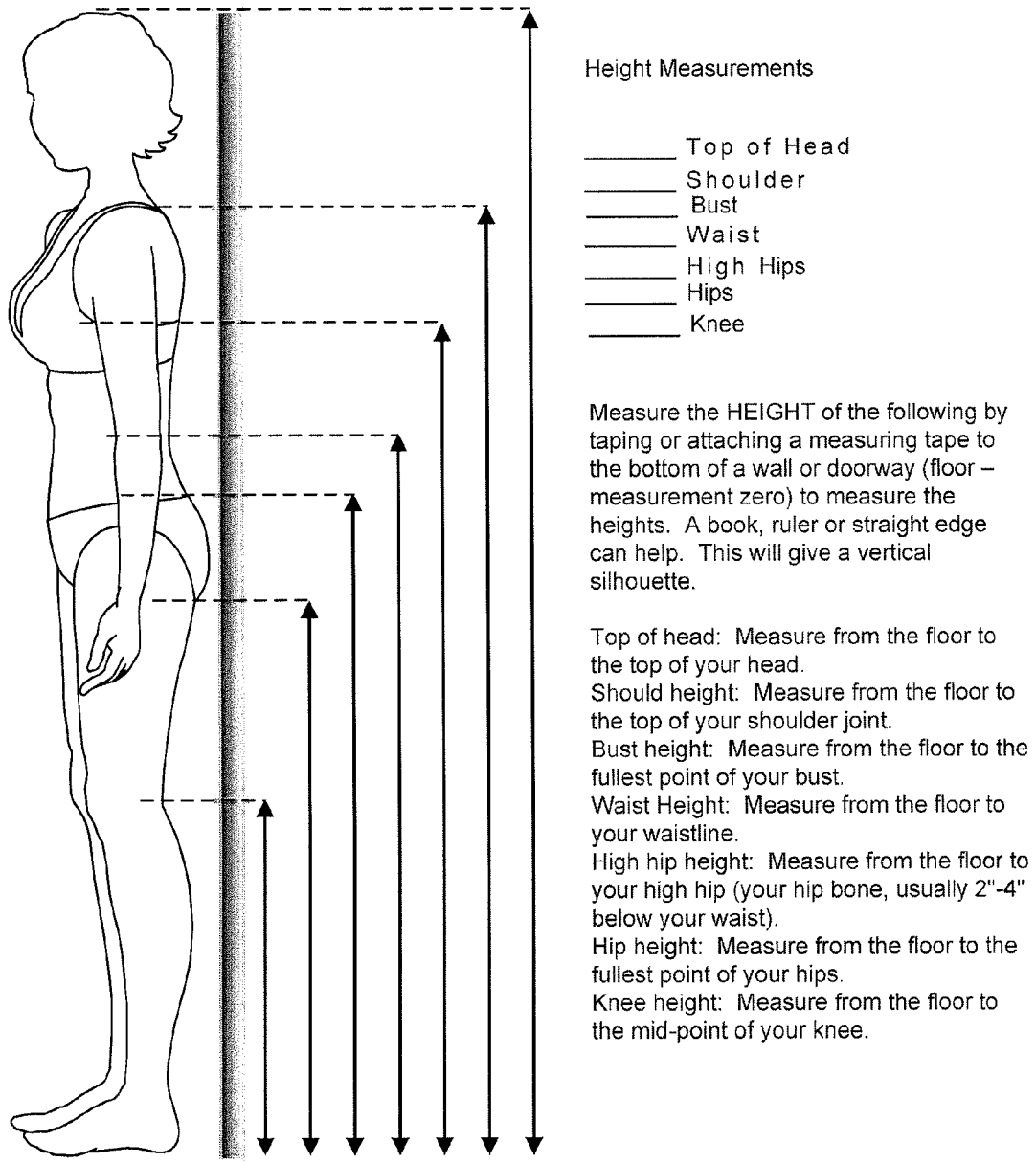

FIG. 3 depicts a definition process 210. The definition process defines a) human body shapes into a set of shapes (represented by shape codes 1 through 7 in this embodiment), b) human body heights into a set of heights (represented by height codes 1 through 6 in this embodiment), c) garment types (sixteen in this embodiment), d) fit rules, and e) fashion rules.

Prior to defining either human body shapes or human body heights, it is first necessary to determine a list of critical measurements of the human body. Table 1 lists twenty-one such measurements as used in one embodiment of the present invention. Other embodiments may use more, fewer or different body measurements. A similar or identical set of measurements may also be used by the categorization process 220 when collecting body measurement data from any individual consumer via the consumer module 110. Note: The measurement reference numbers appearing in Table 1 will be subsequently used throughout this document to concisely write formulae. The lowercase "c" (for consumer) denotes these measurements are provided by the consumer, such as might result from personal manual measurements.

TABLE 1

Body Measurements

| Measurement Name | Measurement Reference # |
|---|---|
| Shoulder Circumference | 1Cc |
| Bust Circumference | 2Cc |
| Waist Circumference | 3Cc |
| High Hip Circumference | 4Cc |
| Hip Circumference | 5Cc |
| Shoulder to Shoulder Front | 6Fc |

TABLE 1-continued

Body Measurements

| Measurement Name | Measurement Reference # |
|---|---|
| Bust Front | 7Fc |
| Waist Front | 8Fc |
| High Hip Front | 9Fc |
| Hip Front | 10Fc |
| Top of Head Height | 11Hc |
| Shoulders Height | 12Hc |
| Bust Height | 13Hc |
| Waist Height | 14Hc |
| High Hips Height | 15Hc |
| Hips Height | 16Hc |
| Knee Height | 17Hc |
| Total Rise | 18Dc |
| Armhole Circumference | 19Dc |
| Inseam | 20Dc |
| Arm | 21Dc |

FIGS. 4A-4D depict the positions and techniques for acquiring body measurements to obtain data shown in Table 1, as an example.

Referring again to FIG. 3, depicting the definition process, human body shapes are defined by a body shape defining process 212. The body shape defining process is a series of calculations establishing arithmetic and/or geometric relationships between the different body measurements to generate an outline of a body. The shape defining process considers front and side outlines in two and three dimensions for each measurement and evaluates the relative proportions of certain points on the torso including, but not limited to: the proportion of the shoulders to the hips, the shoulders to the bust, the bust to the waist, the waist to the hip, the proportion of the body mass that is in the front bisection of the body, etc.

For example, one of the calculations of the shape defining process might determine the value of the shoulder circumference minus the hip circumference. Referring to the measurement reference numbers in Table 1, this calculation can be represented as the formula 1Cc-5Cc. Another calculation is bust circumference minus front bust divided by bust circumference, i.e., (2Cc-7Fc)/2Cc. Table 2 lists the formulae and result names for the thirteen such calculations used by the shape defining process in one embodiment. Note: the two preceding example calculations can be found listed in Table 2 as Values 1 and 6 respectively.

TABLE 2

Shape Defining Process Calculations
Measurement Formula = Result Name

| |
|---|
| 1Cc – 5Cc = Value1 |
| 2Cc – 3Cc = Value2 |
| 2Cc – 5Cc = Value3 |
| 5Cc – 3Cc = Value4 |
| (1Cc – 7Fc)/1Cc = Value5 |
| (2Cc – 7Fc)/2Cc = Value6 |
| (3Cc – 8Fc)/3Cc = Value7 |
| (4Cc – 10Fc)/4Cc = Value8 |
| (5Cc – 10Fc)/5Cc = Value9 |
| 12Hc – 16Hc = Value10 |
| 13Hc – 14Hc = Value11 |
| 16Hc – 14Hc = Value12 |
| 16Hc – 17Hc = Value13 |

In another embodiment, a shape code may be determined using the three-dimensional (3-D) lines of the body's measurements and relative proportions of height and girth of shoulders, bust, waist, high hips and hips and knee. Such 3-D measurements may be used to determine a curve for the shape of the body in 3-D. A comparison of the two 3-D measurements may be used to determine a body shape code geometrically.

Referring to FIG. 3, human body measurement data taken from representative samples of the human population and sub-populations (e.g., U.S. women aged 40-65) form the inputs of the shape defining process 212. The sample body measurement data is statistically analyzed to discern clustered subsets within the population, each sharing common data values. Each body shape is defined by a core set of measurement values together with an acceptable range of deviation from the mean for each value. In one embodiment, there are seven such subsets named and coded as "Shape 1" through "Shape 7". In other embodiments, there might be more or fewer shape codes.

Similarly, the same sample body measurement data form the inputs of a body height defining process 214. The height defining process is a series of calculations establishing arithmetic and/or geometric relationships between the total body height (11Hc in Table 1) and hip circumference (5Cc). The sample data is statistically analyzed to discern clustered subsets within the population, each sharing common data values within an acceptable range of deviation from the mean for each value. In one embodiment there are six such subsets named and coded as "Height 1" through "Height 6". It should be noted that other embodiments might have more or fewer than six height codes.

The definitions of the seven body shape codes and six body height codes are stored in the definitions & rules database 139c as maintained by database server 138. Thus, having been defined, these seven body shape codes may then be assigned by the categorization process 220 to individual consumers whose measurements fall within the range of values corresponding to any particular shape code. Similarly, the six body height codes may be assigned by the categorization process to individual consumers whose measurements fall within the range of values corresponding to any particular height code. Similarly, shape codes may also be assigned to individual garments and outfits.

Prior to defining garment types or the fit and fashion rules, as defined herein, it is first necessary to determine a list of critical garment measurements. Table 3 lists twenty-seven such measurements as used in one embodiment of the present invention. Other embodiments may use more, fewer or different garment measurements. A similar or identical set of measurements may be used by the categorization process 220 when collecting garment measurement data for any individual garment via the manufacturer module 120. Note: The measurement reference numbers appearing in Table 3 will be subsequently used throughout this document to concisely write formulae. The lowercase "g" denotes these are garment measurements.

TABLE 3

Garment Measurements

| Measurement Name | Measurement Reference |
| --- | --- |
| Shoulder Circumference | 1Cg |
| Bust Circumference | 2Cg |
| Waist Circumference | 3Cg |
| High Hip Circumference | 4Cg |
| Hip Circumference | 5Cg |
| Shoulder to Shoulder Front | 6Fg |

TABLE 3-continued

Garment Measurements

| Measurement Name | Measurement Reference |
| --- | --- |
| Bust Front | 7Fg |
| Waist Front | 8Fg |
| High Hip Front | 9Fg |
| Hip Front | 10Fg |
| Shoulder to Bust Height | 11Hg |
| Shoulder to Waist Height | 12Hg |
| Shoulder to High Hip Height | 13Hg |
| Shoulder to Hip Height | 14Hg |
| Shoulder to Hem Height | 15Hg |
| Waist to Hem Height | 16Hg |
| Center Front to Hem Height | 17Hg |
| Center Back to Hem Height | 18Hg |
| Outseam | 19Hg |
| Total Rise | 20Dg |
| Armhole Circumference | 21Dg |
| Inseam | 22Dg |
| Sleeve Length | 23Dg |
| Neck to Shoulder | 24Dg |
| Front Rise | 25Dg |
| Thigh Circumference | 26Dg |
| Bottom of Leg Circumference | 27Dg |

Referring to FIG. 3, the input employed to define garment types, fit rules and fashion rules is human fashion expertise. There are clothing designers and fashion experts skilled in the art and business of apparel making whose experience is called upon to define various garment types. Table 4 lists an example of sixteen such garment types as used in one embodiment.

TABLE 4

Garment Types

| Garment Type Name | Garment Type Reference |
| --- | --- |
| Fitted Dress | D1 |
| Straight Dress | D2 |
| Knit Dress | D3 |
| Fitted Jacket | J1 |
| Straight Jacket | J2 |
| Knit Jacket | J3 |
| Fitted Top | T1 |
| Straight Top | T2 |
| Knit Top | T3 |
| Fitted Skirt | S1 |
| Straight Skirt | S2 |
| Fitted Pants | P1 |
| Straight Pants | P2 |
| Overalls | P3 |
| Fitted Coat | C1 |
| Straight Coat | C2 |

As defined herein, during a match assessment 230 the measurements of a particular garment are compared to the measurements of a particular consumer. But a garment's type will necessarily affect which measurements are considered. For example, while a jacket may have a shoulder circumference (1Cg), a pair of pants would not. Similarly, measurement tolerances will also vary by garment type. Since they are cut differently, a Straight Dress (D2) may have a different bust tolerance than a Fitted Dress (D1). Because measurements and tolerances vary by garment type, each garment type has a corresponding Garment Type Definition Table, setting forth a generalized fit rule for that garment type.

Table 5 is the Garment Type Definition Table for a Fitted Jacket as used in one embodiment. In this embodiment, there are three tolerances for most measurements, namely "snug", "regular" and "loose". Of course, other sets of tolerances could be used instead.

TABLE 5

Garment Type Definition Table for Fitted Jacket (J1)

| Measurement Name | Tolerance Number | Tolerance Name | Tolerance Percent Range | |
|---|---|---|---|---|
| Shoulder Circumference (1Cg) | 1 | snug | 0.949 | 0.974 |
| | 2 | regular | 0.923 | 0.949 |
| | 3 | loose | 0.897 | 0.923 |
| Bust Circumference (2Cg) | 1 | snug | 0.944 | 0.986 |
| | 2 | regular | 0.903 | 0.944 |
| | 3 | loose | 0.889 | 0.903 |
| Waist Circumference (3Cg) | 1 | sung | 0.948 | 0.983 |
| | 2 | regular | 0.914 | 0.948 |
| | 3 | loose | 0.862 | 0.914 |
| High Hip Circumference (4Cg) | 1 | snug | 0.959 | 0.986 |
| | 2 | regular | 0.932 | 0.959 |
| | 3 | loose | 0.892 | 0.932 |
| Hip Circumference (5Cg) | 1 | snug | 0.963 | 0.988 |
| | 2 | regular | 0.939 | 0.963 |
| | 3 | loose | 0.902 | 0.939 |
| Armhole Circumference (21Dg) | 1 | snug | 0.956 | 0.971 |
| | 2 | regular | 0.912 | 0.956 |
| | 3 | loose | 0.824 | 0.912 |
| Shoulder Front (6Fg) | 1 | snug | 0.949 | 0.974 |
| | 2 | regular | 0.923 | 0.949 |
| | 3 | loose | 0.897 | 0.923 |
| Bust Front (7Fg) | 1 | snug | 0.944 | 0.986 |
| | 2 | regular | 0.903 | 0.944 |
| | 3 | loose | 0.889 | 0.903 |
| Waist Front (8Fg) | 1 | snug | 0.948 | 0.983 |
| | 2 | regular | 0.914 | 0.948 |
| | 3 | loose | 0.862 | 0.914 |
| High Hip Front (9Fg) | 1 | snug | 0.959 | 0.986 |
| | 2 | regular | 0.932 | 0.959 |
| | 3 | loose | 0.892 | 0.932 |
| Hip Front (10Fg) | 1 | snug | 0.963 | 0.988 |
| | 2 | regular | 0.939 | 0.963 |
| | 3 | loose | 0.902 | 0.939 |
| Shoulder to Waist Height (12Hg) | 1 | snug | 0.954 | 1 |
| | 2 | regular | 0.9 | 0.954 |
| | 3 | loose | 0.846 | 0.9 |
| Shoulder to Hem Height (15Hg) | 1 | bust | 1.326 | 2.326 |
| | 2 | waist | 0.948 | 1.2 |
| | 3 | high hip | 0.979 | 1.17 |
| | 4 | hip | 1.012 | 1.327 |
| | 5 | thigh | 1.228 | 1.377 |
| | 6 | mini | 0.727 | 0.9 |
| | 7 | above knee | 0.9 | 0.953 |
| | 8 | at knee | 0.953 | 1.04 |
| | 9 | below knee | 1.04 | 1.137 |
| | 10 | mid-calf | 1.137 | 1.277 |
| | 11 | ankle length | 1.347 | 1.42 |
| | 12 | floor length | 1.42 | 1.463 |
| Sleeve Length (23Dg) | 0 | no preference | n/a | n/a |
| | 1 | strap | n/a | n/a |
| | 2 | sleeveless | n/a | n/a |
| | 3 | short | 0.201 | 0.531 |
| | 4 | three quarters | 0.64 | 0.919 |
| | 5 | long | 0.953 | 1.039 |
| Neck to Shoulder Length (24Dg) | 1 | snug | 0.949 | 0.974 |
| | 2 | regular | 0.923 | 0.949 |
| | 3 | loose | 0.897 | 0.923 |

A garment type definition table specifies the measurements, tolerances and order of calculation to be used by the measurement filter 232 during a match assessment 230, as defined herein. Tolerances may be specified as discrete values, discrete percentages, a range of values or percentages, and/or an array of values or percentages. Tolerance specifications can have absolute or "fuzzy" values or ranges, and may use comparative operands, such as equal to, greater than, etc. Tolerance specifications might also vary by shape code.

At times, an individual garment may have idiosyncratic properties that are unique to that garment. For example, a particular Fitted Dress may be made of very stretchy fabric giving its shoulder, bust and waist tolerances greater ranges than the standard tolerances specified by the Fitted Dress Definition Table (not pictured). In such cases the generalized fit rule and tolerances of a garment type definition table can be overridden by idiosyncratic rules and tolerances that are specified in an individual garment's garment record, as defined herein.

Garment type definitions together with their fit rules and tolerances are stored in a definitions & rules database 139c as maintained by database server 138.

Whether a garment flatters its wearer is a matter of opinion. Judgments of fashion, style and taste are highly variable by place, time and culture. Nevertheless, there are arbiters of taste and fashion experts who formulate general rules and guidelines helpful in determining whether a garment flatters a wearer. For example, one rule might state that garments with thick horizontal stripes are unsuitable on short round bodies. Referring again to FIG. 3, fashion expertise forms the input for defining a plurality of such fashion rules as used by the consumer-garment matching method defined herein. The fashion rules, defined in a collection of Fashion Suitability Tables, comprise of multivariate comparisons of data including, but not limited to, shape and height codes, garment type, fabric color and pattern, hair and skin color, neckline, sleeve and pocket styles, etc. For example, one fashion rule posits that for each body height there are certain skirt styles that are more flattering. Table 6a is a Height Code/Skirt Code Table listing skirt styles suitable for each height code, as used in one embodiment. Table 6b lists the skirt style names corresponding to the skirt code numbers referenced in Table 6a.

TABLE 6a

Height Code/Skirt Code Suitability Table

| Height Code | Skirt Style Codes |
|---|---|
| 1 | 1, 2, 4, 6, 7, 8, 9, 10, 12, 14, 15, 17 |
| 2 | 1, 2, 3, 4, 5, 6, 7, 8, 9, 10, 11, 12, 13, 14, 15, 16, 17 |
| 3 | 1, 2, 3, 4, 5, 6, 7, 8, 9, 10, 11, 13, 14, 16, 17 |
| 4 | 1, 3, 6, 7, 8, 9, 14, 16, 17 |
| 5 | 1, 3, 6, 7, 8, 9, 10, 14, 16, 17 |
| 6 | 1, 2, 3, 6, 7, 8, 9, 11, 13, 14, 16, 17 |

TABLE 6b

Skirt Style Code/Skirt Style Name Table

| Skirt Style Code | Skirt Style Name |
|---|---|
| 1 | A-Line |
| 2 | Straight |
| 3 | Pleated |
| 4 | Gathered |
| 5 | Full |
| 6 | Flared |
| 7 | Gored |
| 8 | Bias |
| 9 | Wrap |
| 10 | Dirndl |
| 11 | Circle |
| 12 | Trumpet |
| 13 | Tiered |
| 14 | Yoked |
| 15 | Tulip |
| 16 | Asymmetrical |
| 17 | Other |

Another fashion rule states that for each body shape there are certain neckline styles which are more flattering. Table 7a is Shape Code/Neckline Style Table listing neckline styles suitable for each shape code as used in one embodiment. In Table 7a, the Shape Codes are represented by the letters M-Y-S-H-A-P-E. Some neckline styles are not recommended (those preceded with "not"), while the remainder are recommended. Table 7b lists the neckline style names corresponding to the neckline code numbers referenced in Table 7a, in one example.

TABLE 7a

Shape Code/Neckline Style Suitability Table

| Shape Code | Neckline Style Code |
|---|---|
| 1 (M) | Not(2, 9) |
| 2 (Y) | Not(4, 6, 9) |
| 3 (S) | All |
| 4 (H) | Not(6, 9, 10) |
| 5 (A) | Not(10) |
| 6 (P) | Not(0, 4, 6, 9) |
| 7 (E) | Not(0, 5, 10) |

TABLE 7b

Neckline Style Code/Neckline Style Name Table

| Neckline Style Code | Neckline Style Name |
|---|---|
| 0 | None/Strapless |
| 1 | Convertible Collar (Including Mandarin) |
| 2 | Cowl |
| 3 | Scoop |
| 4 | Bateau |
| 5 | Crew/Jewel |
| 6 | Turtle/Mock |
| 7 | Gathered |
| 8 | V-Neck |
| 9 | Square |
| 10 | Halter |
| 11 | Straps |
| 12 | Off-Shoulder |
| 13 | Shawl |
| 14 | Henley |
| 15 | Placket |
| 16 | Sweetheart |
| 17 | Asymmetrical/Yoke |
| 18 | Bow/Tie |
| 19 | Other |

Like fit rules, certain fashion rules might employ tolerances that may be specified as discrete values, discrete values percentages, a range of values or percentages, and/or an array of values or percentages. Tolerance specifications can have absolute or "fuzzy" values or ranges, and may use comparative operands, such as equal to, greater than, etc. Tolerance specifications might also vary by shape-code.

The Fashion rules, tolerances and fashion suitability tables are stored by the definition process 210 in a definitions & rules database 139c as maintained by database server 138.

Categorization Process

A categorization process 220 provides a means to: collect data describing individual consumers and individual garments, categorize those consumers and garments by shape and/or height, and store the resulting consumer and garment records in computer databases. A consumer record 229a data describing an individual consumer, including her body measurements and personal profile data, e.g., her clothing preferences (such as fabric color) together with her tolerances (such as snugness of fit across the bust). A means is provided to categorize the consumer by body shape and height, and to store the corresponding shape code height code in her record. A consumer may also be assigned a a unique identification number.

A garment record 229b is data describing an individual garment, including its measurements and profile, e.g., its color, fabric, tolerances, etc. A means is provided to categorize the garment by body shape, and assign the corresponding shape code or codes to its record. Additionally, the garment is categorized by garment type, and the corresponding garment type code is assigned to the garment's record. A garment may also be assigned a unique identification number.

The consumer records 229a are stored by the categorization process 220 in a consumer database 139a, while garment records 229b are stored in a garment database 139b. The consumer and garment databases are maintained by database server 138.

Figure 5A:
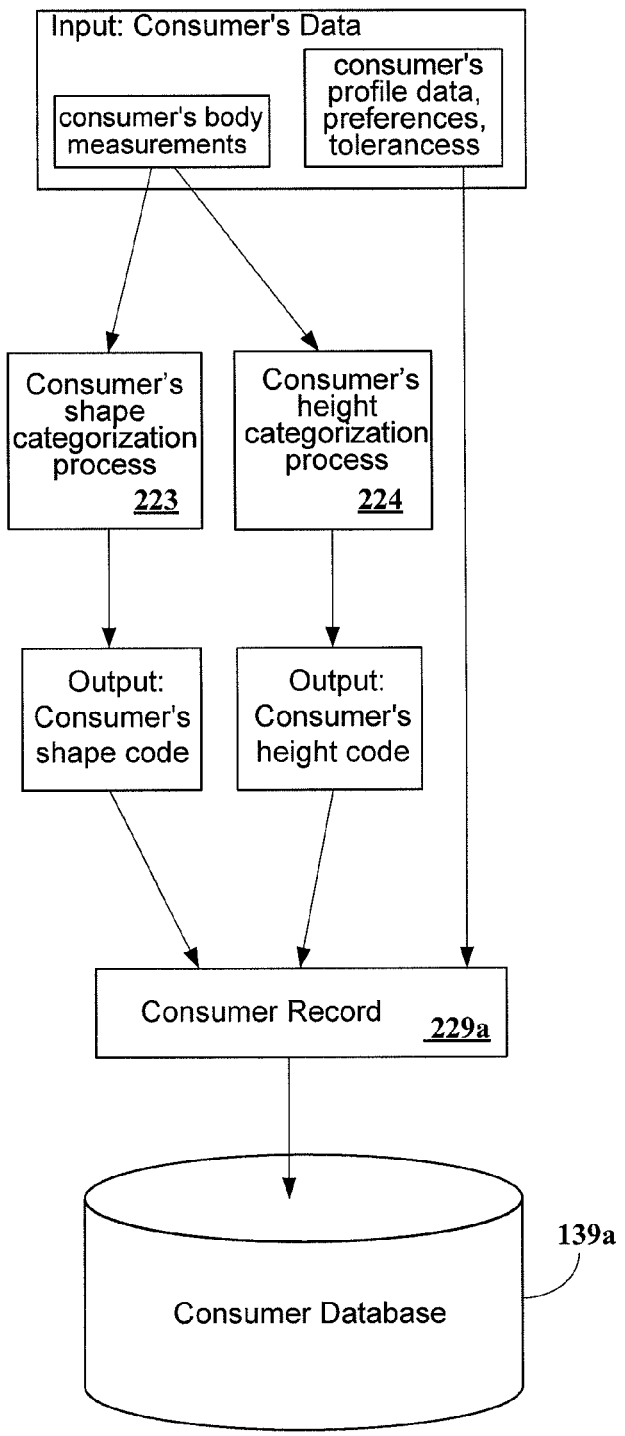
FIGS. 5a and 5b are simplified block diagrams of a categorization process, in accordance with described embodiments.
Figure 5B:
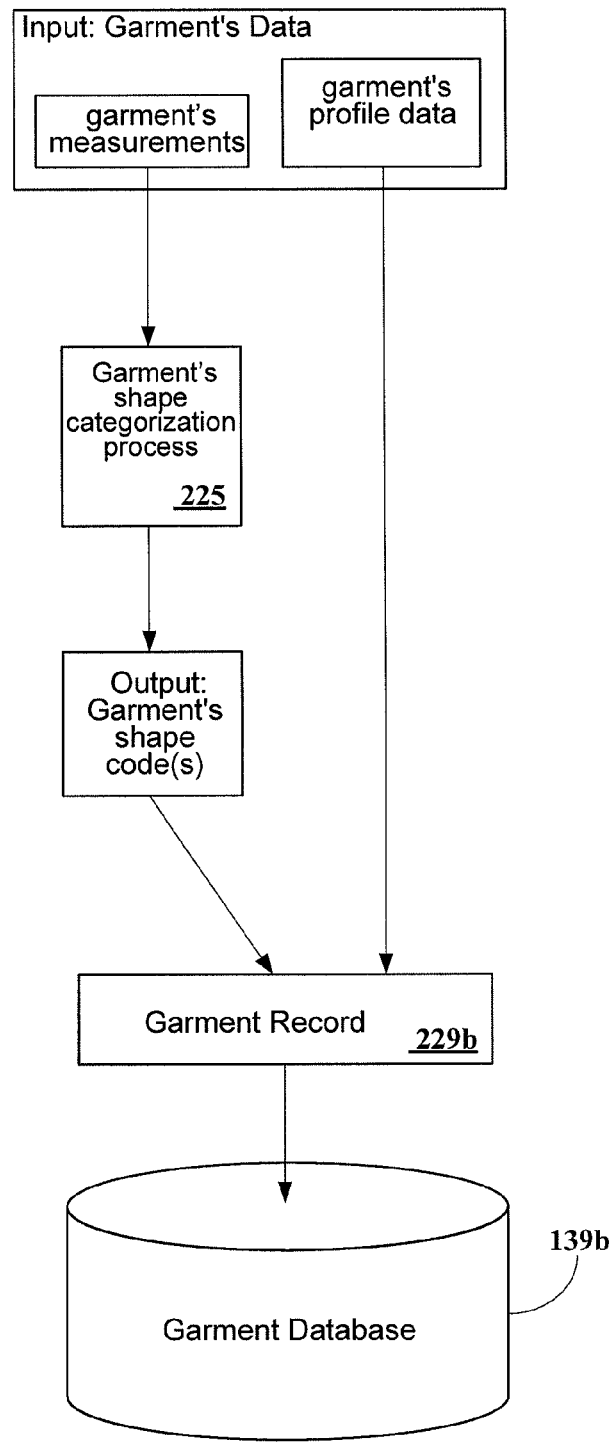

As embodied herein and depicted in FIG. 5, a categorization process 220 has two sub-processes: consumer recording 221 (FIG. 5a) and garment recording 222 (FIG. 5b).

Consumer Recording

The consumer module 110, described herein, supplies the consumer measurement and profile data that form the inputs of the consumer recording process. (In practice, that data may also be input or edited via the administrative backend 130.) An individual consumer's body measurements, such as those listed in Table 1 and depicted in FIGS. 4A-4D, are input into a consumer shape categorization process 223. The consumer shape categorization process may be implemented using a series of calculations that establish arithmetic and/or geometric relationships between the different body measurements. These calculations closely follow the transforms of the shape defining process 212 used in the definition process 210 described above, but also included in the calculation is a best-fit analysis to determine which body shape the individual consumer most closely matches. The resulting shape code is assigned to the consumer and stored in her record 229a. A shape might also be generated by a combination of measurements and other profile questions, such as profile questions answered by the consumer (e.g., "is your stomach fuller than your bottom") or by a combination of profile questions without measurements.

Consider a consumer, Jane. Using her home PC 112, Jane accesses the consumer module 140 of the clothes shopping system 100 and avails herself of the opportunity to shop and learn her shape code. Following on-screen instructions she uses a tape measure to collect her body measurements and enters them into an online form. She also enters her other profile information. This data is sent to backend 130 for consumer recording. Jane's returned shape code may be displayed to her. She may also receive an email containing her shape code in a printable, machine-readable format, such as a barcode. The resultant shape code may be physically sent to Jane in a variety of forms, such as a printed receipt, or embedded along with all, or part, of her consumer record on a magnetic card, or a SmartCard™, etc. It may also be forwarded to her cellular phone, e.g., as a data file or an executable program. A consumer's body measurements may also be collected automatically; for example, by a full-body scanner at a retail establishment.

In a similar fashion, a consumer height categorization process 224 calculates a consumer's height code. The height categorization process calculates the relationship between the consumer's total height and her hip circumference (measurement references 11Hc and 5Cc, respectively, in Table 1). Table 8 lists the calculations, as used in one embodiment, to assign a height code to a consumer. The assigned height code can be stored in the consumer's record 229a.

TABLE 8

Consumer Height Categorization Process Calculations Example

| Measurement Formulae | Height Name | Height Code |
|---|---|---|
| 11Hc < 63" and 5Cc < 48" | Petite | 1 |
| 63" <= 11HC <= 68" and 5Cc < 48" | Regular | 2 |
| 11HC > 68" and 5Cc < 48" | Tall | 3 |
| 11HC < 63" and 48" <= 5Cc < 50" | Petite Plus | 4 |
| 63" <= 11HC <= 68" and 50" <= 5Cc <= 52" | Regular Plus | 5 |
| 11HC > 68" and 5Cc > 52" | Tall Plus | 6 |

An individual consumer's profile data, as collected via the consumer module 110, are also input and stored in the consumer's record 229a. A consumer's profile is data describing an individual consumer, her clothing preferences and her preferred tolerances. Table 9 lists 32 profile data points as used in one embodiment. Note: values given are examples and may in practice be represented by code numbers, arrays, ranges, etc. For example, Bust Tolerance (1002D) may be a numeric value (1=snug, 2=regular, 3=loose fitting); homeowner (1029D) may be a Boolean value (0 or 1); while "Brands I buy" (1008D) may be an array of alphanumeric values derived from a lookup table of popular brands (e.g., EF234, C656).

TABLE 9

Consumer Profile Data Example

| Profile Name | Profile Reference | Value |
|---|---|---|
| Shoulder Tolerance | 1001Dc | regular |
| Bust Tolerance | 1002Dc | regular |
| Waist Tolerance | 1003Dc | snug |
| Hip Tolerance | 1004Dc | loose |
| My Color Palette | 1005Dc | Autumn |
| Styles Desired | 1006Dc | romantic, dramatic, casual |
| Fabrics Desired | 1007Dc | cotton, wool, linen |
| Brands/Designers I buy | 1008Dc | Brand1, Brand2 |
| Brands/Designers I like | 1009Dc | Brand3, Brand2 |
| Clothes I find it difficult to find | 1010Dc | pants |
| Normally I wear style | 1011Dc | petite |
| Normally I buy size | 1012Dc | 6 |
| I usually spend amount per outfit | 1013Dc | $350 |
| I wear my pants | 1014Dc | 1" below waist |
| I usually shop at | 1015Dc | retail |
| I buy on sale | 1016Dc | occasionally |
| % of purchases online | 1017Dc | 15% |
| I have returned | 1018Dc | often |
| I usually spend per shop | 1019Dc | $100 |
| I get my news from | 1020Dc | online, TV |
| I get my fashion news from | 1021Dc | TV, magazines |
| My favorite websites | 1022Dc | myshape.com |
| Associations I belong to | 1023Dc | Zonta |
| My hobbies | 1024Dc | knitting |
| I volunteer | 1025Dc | yes |
| I meditate | 1026Dc | no |
| I enjoy sports | 1027Dc | tennis, swimming |
| Music I prefer | 1028Dc | soft rock |
| Homeowner | 1029Dc | Yes |
| Car I drive | 1030Dc | Toyota Prius |
| My children | 1031Dc | girl 8, boy 6 |
| My household income | 1032Dc | >$65,000 |

Garment Recording

The manufacturer module 120, described herein, supplies the garment measurements and profile data that form the inputs of the garment recording process 232. (In practice, that data may also be input or edited via the administrative backend 130.) The measurements of any particular garment may include values for all, or a subset, of those garment measurements listed earlier in Table 3. For different garment types there are different critical measurements. For example, a dress will have different measurement points than a jacket or pants. These measurements may be taken from the pattern guide, or be imported from the CAD representation in the manufacturer's cutting system, or manually from the garment itself.

Referring again to FIG. 5, a garment's measurements are inputs to a garment shape categorization process 225. In one embodiment, the garment shape categorization process may comprise a series of calculations that establish arithmetic and/or geometric relationships (expressed as curves) between the various garment measurements. The garment's curves, derived from the measurements, are compared to the curves represented by each of the seven body shapes to determine whether the garment is suitable for one or more body shapes. The curves are compared in front, side and back profiles. The curves may also be compared three-dimensionally (i.e., 3-D) with the volume of the front half of a body shape being compared with the volume of the front half of the garment. A best-fit analysis determines which body shape or shapes the garment most closely matches, as it is possible for a garment to be appropriate for more than one body shape. The resulting shape codes are assigned to the garment and stored in its garment record 229b.

An individual garment's profile data, as collected via the manufacturer module 120, are also input and stored in the garment's record 229b. A garment's profile is data describing an individual garment. Table 10 lists an example of 23 such data points as used in one embodiment. Note: values given are examples and may in practice be represented by code numbers, arrays, ranges, etc.

TABLE 10

Garment Profile Data Example

| Profile Name | Profile Reference | Value |
|---|---|---|
| FIT (1 = snug 1B, 1W, 1H; 2 = fitted 2B, 2W, 2H; 3 = loose 3B, 3W, 3H) | 101Cg | 2B, 2W |
| Garment Type | 102Dg | Fitted Dress |
| Garment Type Code | 103Dg | D1 |
| Garment Descriptor | 104Dg | Fitted |
| Description | 105Dg | Natasha's, bust darts |
| Brand | 106Dg | Smart Fashions |
| Recommended Retail Price | 107Dg | $375 |
| Pocket | 108Dg | 4 front pockets |
| Collars and Yokes | 109Dg | round |
| Neckline | 110Dg | crew/jewel |
| Fastening | 111Dg | side zipper |
| Sleeve style | 112Dg | long sleeves |
| Leg Style | 113Dg | ~ |
| Skirt Style | 114Dg | a-line |
| Color | 115Dg | chocolate brown |
| Origin | 116Dg | Australia |
| Use | 117Dg | career |
| Style | 118Dg | classic |
| Fabric | 119Dg | 72% polyester 22% viscose, 6% elastane |
| Care Instructions | 120Dg | hand wash do not tumble dry or dry clean |
| Manufacturer's Size | 121Dg | 1 |
| Priority Code | 123Dg | |

The consumer records 229a can be stored in a consumer database 139a, while garment records 229b can be stored in a garment database 139b. The consumer and garment databases can be maintained by database server 138.

Match Assessment Process

Figure 6:
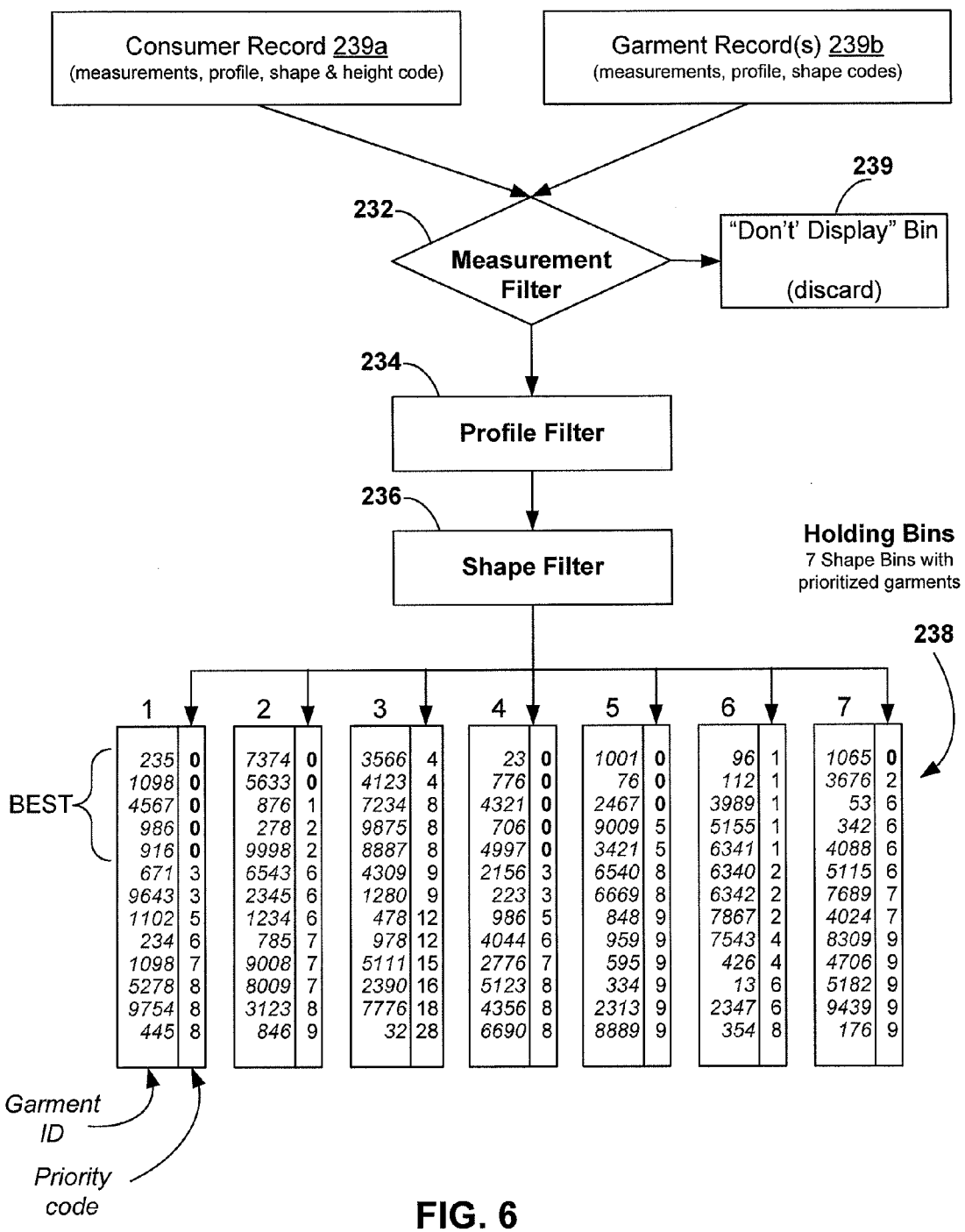
FIG. 6 is a simplified block diagram of a match assessment process, in accordance with described embodiments.

FIG. 6 depicts a match assessment process 230. The match assessment process may be carried out at the administrative backend 130 utilizing application 136, Web 134, database 138, and other servers. In one embodiment, the match assessment process may be used to compare an individual consumer's record 229a with one, or more, garment records 229b. When more than one garment is considered, the match assessment process is conducted iteratively, i.e., by comparing the consumer's record to each garment's record in turn, until all garment records have been compared. This results in a scored, sorted and filtered list of those garments which match that consumer. The match assessment process might also be described formulaically as locating a person in an N-dimensional person space (P) based on their shape, measurements, etc., locate a garment in an N-dimensional garment space (G), repeat this for all the garments, to generate a mapping of person to garments, f:P -->G.

The inputs of the match assessment process are a consumer record 229a obtained from the consumer database 139a as maintained by database server 138, and one, or more, garment records 229b obtained from the garment database 139b, also maintained by database server 138.

The match assessment process 230 is comprised of three filters: a measurement filter 232, a profile filter 234, and a shape code filter 236. The output of the filters is a ranked and sorted listing of matching garments. In one embodiment, the sorting is composed of seven "Holding Bins" 238—one for each shape code, and a Bin D 239—"Don't Display" i.e., discarded garments that do not fit the consumer. During each assessment a garment is temporarily assigned a priority code (Profile Reference # 123Dg). The priority code determines a garment's rank within its holding bin 238. This is most useful for the personal shopping process 240, as described herein, where the priority code determines the order in which matching garments are displayed to the consumer.

As an example of the rules and steps needed to conduct a match assessment, consider a consumer, Jane, and a fitted dress from designer "Smart Fashions" (a made-up name for the purposes of this example). Table 11 lists the data that comprises Jane's consumer record, containing her Consumer ID, body measurements, height code, shape code, and profile data.

TABLE 11

Jane's Data

| Data Point Reference # | Data Point Name | Example Value |
| --- | --- | --- |
| | Consumer ID | 1303 |
| | Measurements | |
| 1Cc | Shoulder Circumference | 36.5 |
| 2Cc | Bust Circumference | 32 |
| 3Cc | Waist Circumference | 29 |
| 4Cc | High Hip Circumference | 32 |
| 5Cc | Hip Circumference | 35 |
| 6Fc | Front/Back Shoulder to Shoulder | 19 |
| 7Fc | Front/back Bust | 17 |
| 8Fc | Front/back Waist | 15.5 |
| 9Fc | Front/back High Hip 4" below waist | 17 |
| 10Fc | Front/back Hip 9" below waist or widest point | 19 |
| 11Hc | Height: Top of Head | 64 |
| 12Hc | Height: Shoulders | 53 |
| 13Hc | Height: Bust | 45.5 |
| 14Hc | Height: Waist | 39 |
| 15Hc | Height: High Hips | 37 |
| 16Hc | Height: Hips | 34 |
| 17Hc | Height: Knee | 17 |
| 18Dc | Total Rise | 28 |
| 19Dc | Armhole Circumference | 18 |
| 20Dc | Inseam | 30 |
| 21Dc | Arm | 20 |
| | Shape | |
| 100Sc | Shape Code | 5 |
| | Height | |
| 101Hc | Height Code | 2 |
| | Profile | |
| 1001Dc | Shoulder Tolerance | 1 |
| 1002Dc | Bust Tolerance | 2 |
| 1003Dc | Waist Tolerance | 1 |
| 1004Dc | Hip Tolerance | 4 |
| 1005Dc | Color Palette | red, yellow, brown |
| 1006Dc | Styles Desired (Romantic, Dramatic, etc.) | classic, elegant |
| 1007Dc | Fabrics Desired (codes) | cotton, wool, polyester, viscose, elastane |
| 1008Dc | Brands/Designers I buy (codes) | |
| 1009Dc | Brands/Designers I like (codes) | |
| 1010Dc | I find it difficult to find (pants, outfits, dresses, skirts, tops) | |

TABLE 11-continued

Jane's Data

| Data Point Reference # | Data Point Name | Example Value |
|---|---|---|
| 1011Dc | Normally I wear (petite, regular, tall) | |
| 1012Dc | Normally I buy size (codes) | 10 |
| 1013Dc | I usually spend amount per garment or outfit (codes) | $400 |
| 1014Dc | I wear my pants (at waist, 1" below, very much below) | |
| 1015Dc | I usually shop (codes) | |
| 1016Dc | I buy on sale (always, sometimes, occasionally) | |
| 1017Dc | % of purchases online | |
| 1018Dc | I have returned (codes) | |
| 1019Dc | I usually spend per shop (codes) | |
| 1020Dc | I get my news from (codes) | |
| 1021Dc | I get my fashion news from (codes) | |
| 1022Dc | My favorite websites (list) | |
| 1023Dc | Associations I belong to (codes) | |
| 1024Dc | My hobbies (codes) | |
| 1025Dc | I volunteer | |
| 1026Dc | I meditate | |
| 1027Dc | I enjoy sports (codes) | |
| 1028Dc | Music I prefer (codes) | |
| 1029Dc | Homeowner (codes) | |
| 1030Dc | Car I drive (codes) | |
| 1031Dc | My children (codes) | |
| 1032Dc | My household income (codes) | |

Table 12 lists the data that comprises the dress' garment record, containing its Garment ID, measurements, shape code(s), and profile data. Note that the bust, waist and other tolerance values (28Dg thru 35Dg) are calculated by referencing tolerance ranges specified in the Garment Type Definition Table for a Fitted Dress (not shown). These garment tolerances indicate the designer's preferred fit for the garment; they should not be confused with the consumer's preferred tolerances (1001Dc-1004Dc).

TABLE 12

Example Fields of a Garment Record for a Dress

| Data Point Reference # | Data Point Name | Example Value |
|---|---|---|
| | Garment ID | G1001 |
| | Measurements | |
| 1Cg | Shoulder Circumference | 37 |
| 2Cg | Bust Circumference | 34 |
| 3Cg | Waist Circumference | 30 |
| 4Cg | High Hip Circumference | 34 |
| 5Cg | Hip Circumference | 39 |
| 6Fg | Shoulder to Shoulder Front | 18 |
| 7Fg | Bust Front | 17 |
| 8Fg | Waist Front | 15 |
| 9Fg | High Hip Front | 17.75 |
| 10Fg | Hip Front | 20.5 |
| 11Hg | Shoulder to Bust Height | 9.5 |
| 12Hg | Shoulder to Waist Height | 16.5 |
| 13Hg | Shoulder to High Hip Height | 20.5 |
| 14Hg | Shoulder to Hip Height | 25.5 |
| 15Hg | Shoulder to Hem Height | 38.75 |
| 16Hg | Waist to Hem Height | |
| 17Hg | Center Front to Hem Height | 40 |
| 18Hg | Center Back to Hem Height | |
| 19Hg | Outseam | |
| 20Dg | Total Rise | |
| 21Dg | Armhole Circumference | 20 |
| 22Dg | Inseam | |
| 23Dg | Sleeve Length | 22.75 |
| 24Dg | Neck to Shoulder | |
| 25Dg | Front Rise | |
| 26Dg | Thigh Circumference | |
| 27Dg | Bottom of Leg Circumference | |
| 28Dg | Shoulder Tolerance | 2 |
| 29Dg | Bust Tolerance | 2 |
| 30Dg | Waist Tolerance | 1.25 |

TABLE 12-continued

Example Fields of a Garment Record for a Dress

| Data Point Reference # | Data Point Name | Example Value |
|---|---|---|
| 31Dg | High Hip Tolerance | 2 |
| 32Dg | Hip Tolerance | 4 |
| 33Dg | Garment Length (above knee, at knee, below knee, mid-calf, floor) | 0 (at knee) |
| 34Dg | Sleeve Tolerance | 3 |
| 35Dg | Armhole Tolerance | 2 |
| | Shape | |
| 100Sg | Shape Code(s) | 1,5 |
| | Profile | |
| 101Cg | FIT (1 = snug 1B, 1W, 1H; 2 = fitted 2B, 2W, 2H; 3 = loose 3B, 3W, 3H) | 2B, 2W |
| 102Dg | Garment Type | Fitted Dress |
| 103Dg | Garment Type Code | D1 |
| 104Dg | Garment Descriptor | Fitted |
| 105Dg | Description | Natasha's, bust darts |
| 106Dg | Brand | Smart Fashions |
| 107Dg | Recommended Retail Price | $375 |
| 108Dg | Pocket (codes) | 4 front pockets |
| 109Dg | Collars and Yokes (codes) | round |
| 110Dg | Neckline (codes) | crew/jewel |
| 111Dg | Fastening (zipper, button, hook, elastic) | side zipper |
| 112Dg | Sleeve style (codes) | long sleeves |
| 113Dg | Leg Style | ~ |
| 114Dg | Skirt Style | a-line |
| 115Dg | Color | chocolate brown |
| 116Dg | Origin (USA, CHINA, Europe, India, Other) | Australia |
| 117Dg | Use (career, casual, special occasion, etc.) | career |
| 118Dg | Style (romantic, dramatic, classic, artistic, basic, elegant, trendy, etc.) | classic |
| 119Dg | Fabric (codes) | 72% polyester 22% viscose, 6% elastane |
| 120Dg | Care Instructions (wash, dry clean, other) | hand wash do not tumble dry or dry clean |
| 121Dg | Manufacturer's Size | 1 |
| 122Dg | Outlier code (customer ID(s)) | |
| 123Dg | Priority Code (temporarily calculated by match assessment) | |

The first step of a match assessment is to determine the garment's type. In this example the garment is a Fitted Dress. Its type code (Table 12, item 103Dg) is "D1". Next, retrieve the garment type definition table for a fitted dress from the definition & rules database 139c as maintained by database server 138. The garment type definition of a fitted dress (not pictured, but similar in format to Table 5) specifies which measurements, tolerances and order of calculation are used by the measurement filter.

The data to populate a data structure containing garment data as illustrated in Table 12 might be provided all or in part by the garment vendors. For example, garment vendors might provide size, height code, body shape, etc. in an uploadable file that is uploaded to populate garment records. A vendor module might be included to provide vendors with an interface to provide that data.

In some variations, the garment record is generated, in whole or part, from descriptions of the garment. This would allow, for example, automated processing of text and other descriptions of garments, perhaps from a vendor's web resources describing that vendor's garments and outfits. An example might be a collection of web pages or a database used for driving a web shopping system. In some embodiments, shape codes might even be determined from the descriptions, such as by processing text describing a garment according to heuristics to arrive at temporary placeholder "estimate" shape codes (until a fashion reviewer reviews the assignment) or the final shape codes to drive usage, such as in a personal store application.

The Measurement Filter

As illustrated in FIG. 6, measurement filter 232 compares the measurements of a garment with those of a consumer. The measurement filter may be comprised of four sets of comparisons: circumference comparisons, front comparisons, height comparisons, and length or other design parameters comparisons. Depending upon garment type, fewer comparisons may be made. For example, a pair of pants would not require a sleeve comparison.

Circumference Comparisons

For each circumference compared, the measurement filter 232 determines if the consumer's body part can physically fit within the garment's part. A circumference comparison calculates the garment's circumference #Cg minus the corresponding consumer's circumference #Cc, as illustrated in the following formula for shoulder circumferences:

$$x=1Cg-1Cc$$

If the result, x, is between zero and the garment's corresponding tolerance, inclusive, then measurement filter proceeds to the next comparison. For example, 28Dg from Table 12 represents a shoulder comparison and if (0<=x<=28Dg), then the measurement filter would proceed to next data point, otherwise the measurement filter discards the current garment into Bin D 239 and proceeds to assess the next garment, if any.

In the current example, Jane's and the dress' circumference data points 1C through 5C are compared in this order: bust circumference (2C), waist circumference (3C), hip circumference (5C), shoulder circumference (1C), and finally high hip circumference (4C). A flowchart 700 of these calculations is depicted in FIG. 7.

Figure 7:
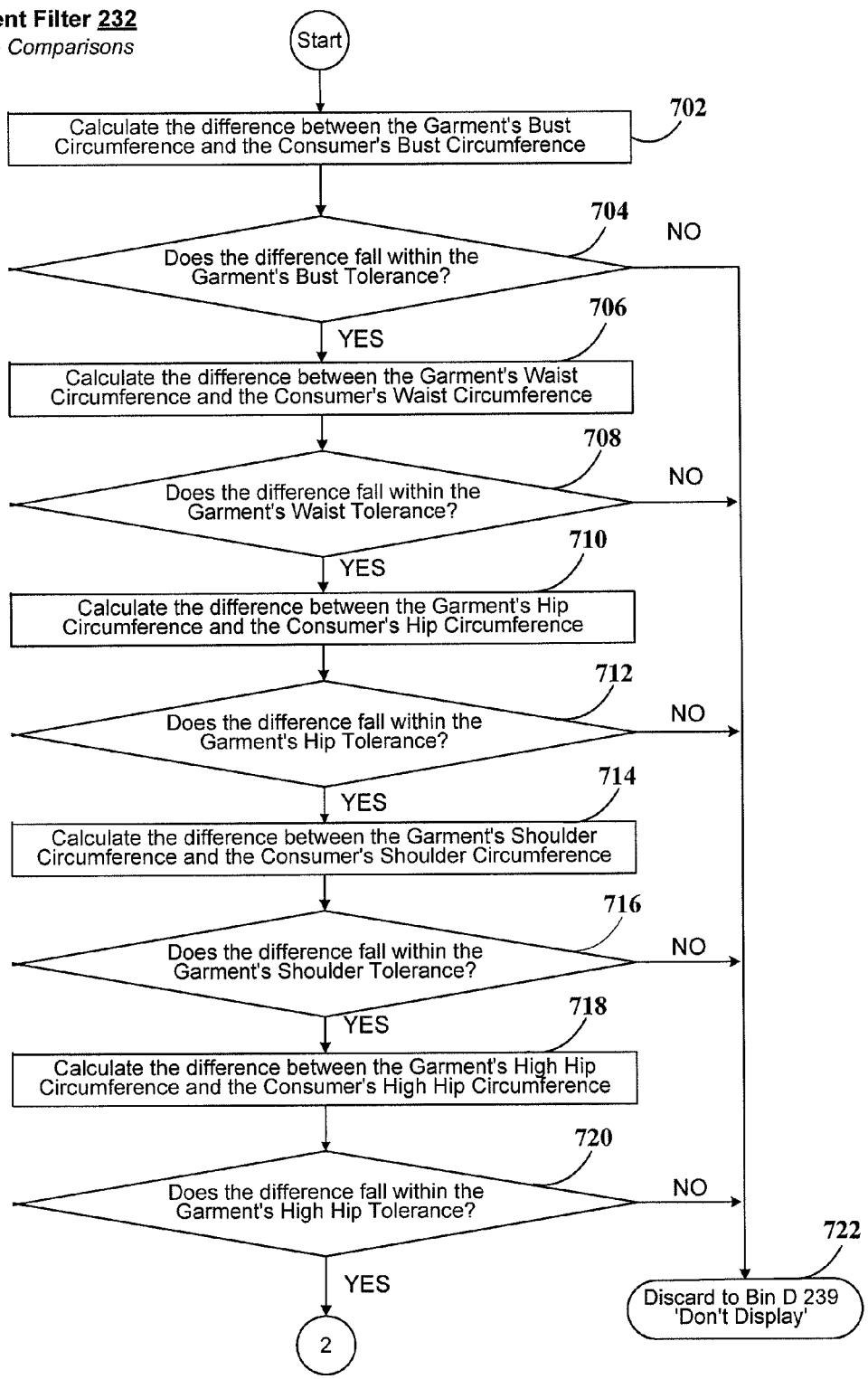

Referring to FIG. 7 and data in Tables 11 and 12, the dress has a bust circumference (2Cg) of 34 and Jane's bust is 32(2Cc). At step 702, the circumference equations result in 34−32=2, and then at step 704, since that result, 2, is more than zero and less than or equal to the dress' bust tolerance (29Dg), in this case, it is 2, then a match is deemed found. Measurement filter 232 processes the next data point—waist circumference (3C). At steps 706 and 708, using the circumference equations, a match is found at step 708 because 30−29 =1 and 0<=1<=1.25.

Measurement filter 232 processes the next data point—Hip Circumference (5C). At steps 710 and 712, using the circumference equations a match is found at step 712 because 39 −35=4 and 0<=4<=4.

Measurement filter 232 processes the next data point—shoulder circumference (1C). At steps 714 and 716, again a match is found at step 716 because 37−36.5=0.5 and 0<=0.5<=2.

Measurement filter 232 processes the next data point—high hip circumference (4C). At steps 718 and 720, a match is found at step 720 because 34−32=2 and 0<=2<=2.

If any of the above comparisons do not match, then the garment is discarded (step 722) and a match assessment is started on the next garment, if any. Since this dress fits Jane at all critical circumferences, measurement filter 232 proceeds to calculate the front comparisons.

Front Comparisons

In one embodiment, measurement filter 232 compares the front data points 6F through 10F for garment and consumer. A front comparison calculates the garment front (#Fg) minus the consumer front (#Fc). This formula is for comparing shoulder front:

$$x=6Fg-6Fc$$

If (0<=x<=28Dg*(6Fc/1Cc)), where x is the result above, 28Dg is the corresponding tolerance (again 28D through 32D), 6Fc is the consumer front #Fg, and 1Cc is the corresponding consumer circumference #Cc (1Cc through 5Cc), then the garment passes and measurement filter 232 proceeds to the next data point. Otherwise, measurement filter 232 discards the current garment into Bin D and proceeds to assess the next garment, if any. A flowchart 800 of these calculations is depicted in FIG. 8.

Figure 8:
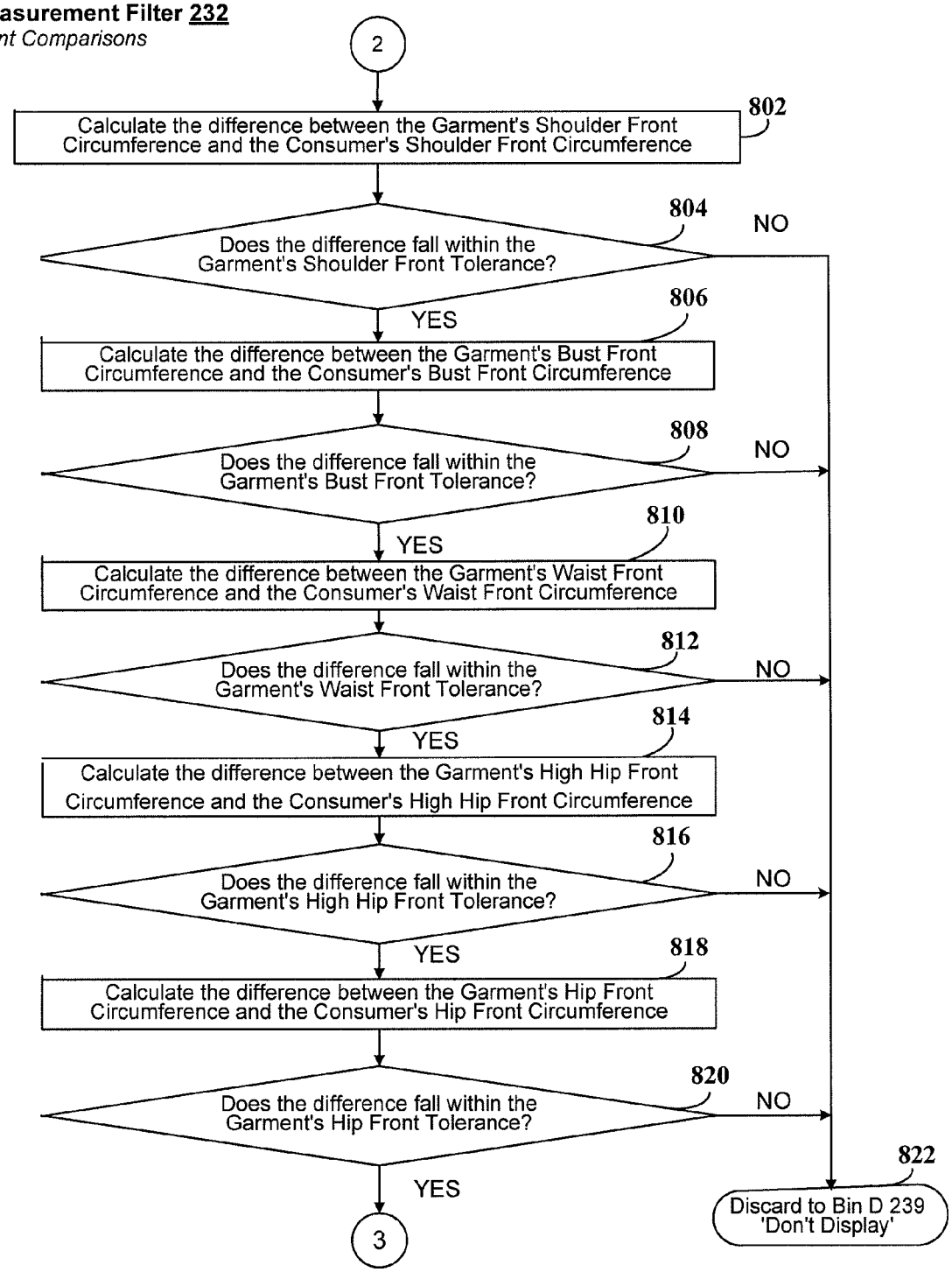

Referring to FIG. 8 and data in tables 11 and 12, the dress has a shoulder front (6Fg) of 19 and Jane's shoulder front (6Fc) is 18. At step 802 the difference between the garment's shoulder front and the consumer's shoulder front is calculated:

$$19-18=1$$

At step 804, 1 is more than zero and less than, or equal to, the dress' shoulder tolerance (28Dg) times Jane's front shoulder (6Fc) divided by Jane's shoulder circumference (1Cc):

$$0<=1<=2*(19/36.5)$$

So a match is found at step 804.

Measurement filter 232 proceeds to process the next data point—bust front (7F). At steps 806 and 808, the difference between the garment's bust front and the consumer's bust front is calculated and the tolerance evaluated. Applying the equations, a match is found at step 808 because 17−17=0 and 0<=0<=2*(17/32).

Measurement filter 232 proceeds to process the next data point—waist front (8F). At steps 810 and 812, the difference between the garment's waist front and the consumer's waist front is calculated and the tolerance evaluated. Applying the equations, a match is found at step 812 because 15.5−15=0.5 and 0<=0.5<=1.25*(16/29).

Measurement filter 232 proceeds to process the next data point—high hip front (9F). At steps 814 and 816, the difference between the garment's high hip front and the consumer's high hip front is calculated and the tolerance evaluated. For example, applying the equations above, a match is found at step 816 because 17.75−17=0.75 and 0<=0.75<=2*(17/32).

Measurement filter 232 proceeds to process the next data point, "hip front (10F)". At steps 818 and 820, the difference between the garment's hip front and the consumer's hip front is calculated and the tolerance evaluated. For example, applying the equations above a match is found at step 820 because 20.5−19=0.5 and 0<=0.5<=4*(19/35).

If any of the above comparisons do not match, then the garment is discarded (step 822) and a match assessment is started on the next garment, if any. Since this dress fits Jane at all critical front comparisons, measurement filter 232 proceeds to calculate the height comparisons.

Height Comparisons

In one embodiment, measurement filter 232 calculates the heights and ensures that any differences are greater than zero. Measurement filter 232 calculates the consumer shoulder height (12Hc) minus the garment shoulder to hem height (15Hc), which may be expressed in the following equation:

$$x=12Hc-15Hg$$

If (0<=x<=17Hc+33Dg), where x is the result above, 17Hc is the consumer knee height and 33Dg is the desired garment length, then measurement filter 232 processes the next data point. Otherwise, measurement filter 232 discards the current garment into Bin D and proceeds to assess the next garment, if any. A flowchart 900 of these calculations is depicted in FIG. 9.

Referring FIG. 9 and to data in Tables 11 and 12, Jane's shoulder height (12Hc) is 53, and the dress' shoulder to hem (15Hg) is 38.75. At step 902, the difference between Jane's shoulder height and the dress' shoulder to hem is calculated:

$$53-38.75=14.5$$

At step 904, the difference evaluated by the height equation. For example, when Jane's knee height is 17 and the dress' desired length is 0, $$0<=14.5<=17+0$$

A match is found at step 904, and measurement filter 232 may proceed to the shoulders to waist height comparison (12H).

In one embodiment, at step 906, measurement filter 232 calculates the difference between consumer shoulder height (12Hc) and consumer waist height (14Hc), using the formula:

$$x=12Hc-14Hc$$

If at step 908, (0<=x<=12Hg) where 12 Hg is the garment shoulder to waist height (12Hg), then measurement filter 232 processes the next data point. Otherwise, measurement filter 232 discards the current garment (step 922) and proceeds to assess the next garment, if any. When comparing Jane's and the dress' shoulder to waist height, a match is found at step

908 because 53−39=14 and 0<=14<=16.5. Measurement filter 232 may proceed process sleeve comparisons at step 910.

Sleeve Comparisons

At step 910, If measurement filter 232 determines that the consumer armhole circumference (19Dc) is less than, or equal to, the garment armhole circumference (21Dg) then measurement filter 232 proceeds to the next data point. Otherwise, measurement filter 232 discards the current garment (step 922) and proceeds to assess the next garment, if any.

Referring to data in Tables 11 and 12, Jane's armhole circumference is 18, and the dress' is 20. At step 910, a match is found because 18<=20.

Measurement filter 232 now proceeds to sleeve length (23Dg). At steps 912, if the garment sleeve length (23Dg) minus the garment sleeve tolerance (34Dg) minus the consumer arm length (21Dc) is less than, or equal to, zero, then the match assessment 230 proceeds to profile filter 234, as described below. Otherwise, measurement filter 232 discards the current garment (step 922) and proceeds to assess the next garment, if any. In this example, a match is found between Jane's arm and the dress' sleeve length because (22.75−3−20)<=0. Match assessment process 230 may proceed to profile filter 234.

Profile Filter

A garment's priority code (123Dg) equals zero. However, during match assessment process 230, the priority code may be temporarily given a numerical value for ranking purposes. If a garment fails any profile filter comparison it is "penalized" by having a number added to its priority code. The priority code determines the order in which garments are recommended and displayed to the consumer in her personalized online store (unless other ordering overrides, such as by also organizing all suitable garments for that consumer into categories). The higher a garment's priority code, the less suitable it is for the consumer and the later it will be displayed to her. The lower a garment's priority code, the more likely it will be displayed. A garment with a priority code of "1" will be recommended and appear before a garment with a priority code of "5". For simplicity in the present example, a "1" is added to the priority code when any profile comparison fails. Note that the value of this penalty could be variable and weighted to a particular comparison. For example, failure to match a consumer's color preference may penalize a garment by 3, whereas failure to match a consumer's fabric preference may only penalize it by 2.

In one embodiment, each consumer profile data point may be assigned a secondary value, referred to as an "importance value" to indicate its relative importance to the consumer. An importance value may be used to modify a corresponding penalty value, making it higher or lower depending upon how important that particular aspect of a garment is to the consumer. For example, Jane may feel that a garment's fabric is more important than its color. If so, Jane may give fabric an importance value of 2 and color an importance value of 1. Using these importance values to modify the earlier example, it is apparent the garment's color penalty remains 3(3*1=3), while its fabric penalty jumps from 2 to 4(2*2=4). For simplicity and clarity in the following examples, all consumer profile data are considered equally important with no importance values being assigned and no modification of penalty values being calculated.

Desired Fit Comparisons

Figure 10:
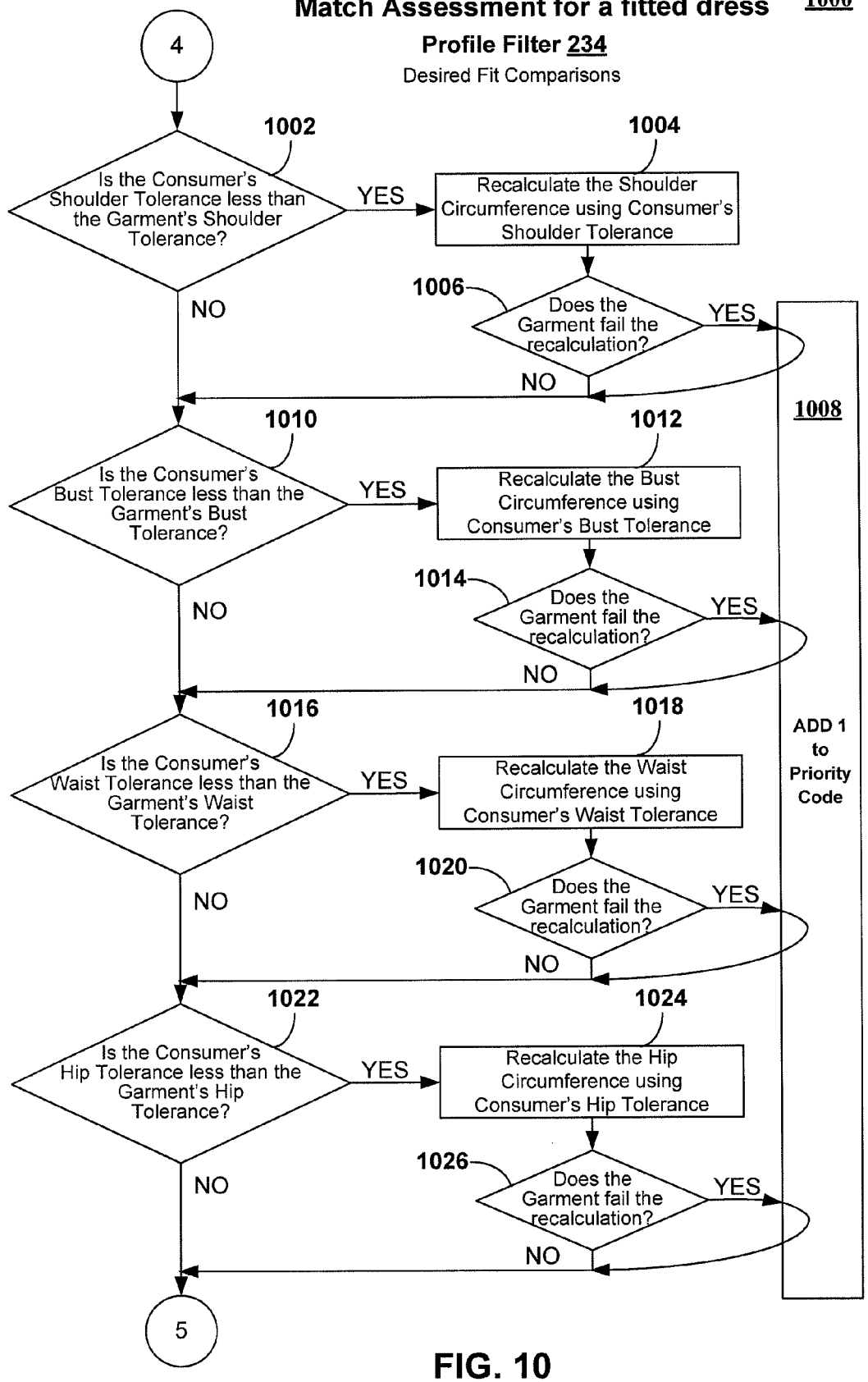

Profile filter 234 compares the consumer's desired fit for certain circumferences. That is, the measurement filter's previous circumference comparisons may be re-run using the consumer's desired tolerances in lieu of the garment's tolerances. For example, a sweater may be designed to fit loosely across the bust, but the consumer prefers a snug fit at her bust. In that case the profile filter would re-run the bust circumference comparison using a snug tolerance value. Then if the sweater does not fit snugly at the consumer's bust, its priority code is incremented, thus penalizing the sweater but not entirely discarding it, because it still fits the consumer, albeit more loosely than she prefers. Thus, if the consumer's desired tolerance at a particular measurement point is less than the garment's tolerance, profile filter 234 runs a modified version of that circumference calculation, substituting the consumer's tolerance for the garment's tolerance. A flowchart 1000 of these desired fit comparisons is depicted in FIG. 10.

At step 1002, if the consumer shoulder tolerance (1001Dc) is less than the garment shoulder tolerance (28Dg), then at step 1004, the shoulder circumference calculation is re-run by substituting the consumer's shoulder tolerance for the garment's shoulder tolerance. If at step 1006, the garment fails the recalculation, then the priority code is increased by one (step 1008) and the next comparison is performed. Therefore, the measurement filter's shoulder circumference comparison given earlier as:

$$x = 1Cg - 1Cc$$

If (0<=x<=28Dg) then proceed to next comparison, else discard garment now becomes:

$$x = 1Cg - 1Cc$$

If NOT(0<=x<=1001Dc) then add 1 to priority code. Proceed to next comparison.

Referring to FIG. 10 and data in Tables 11 and 12, in the current example Jane's shoulder, bust, waist and hip tolerances (1001Dc through 1004Dc) are used. Jane prefers a snug fit at her shoulders; she has a desired shoulder tolerance of only 1. That is less than the garment's shoulder tolerance of 2, which was used in earlier shoulder circumference comparison. So, profile filter 234 substitutes Jane's value and recalculates the shoulder circumference:

37−36.5=0.5

0<=0.5<=1

That result is TRUE. Having passed the recalculation, the dress is not penalized, and its priority code remains a perfect zero.

At steps 1010 through 1022, Jane's bust, waist and hip tolerances (1002Dc-1004Dc) are not less than the corresponding garment tolerances (29Dg, 30Dg and 32Dg), so there is no need to recalculate those circumferences. However, if they were recalculated a "1" would be added to the priority code for each recalculation failure.

In this example the dress has passed the shoulder circumference recalculation and no further desired fit comparisons need to be recalculated. Thus, match assessment process 230 proceeds to the other profile comparisons with the dress' priority code still equaling zero.

Profile Comparisons

Figure 11:
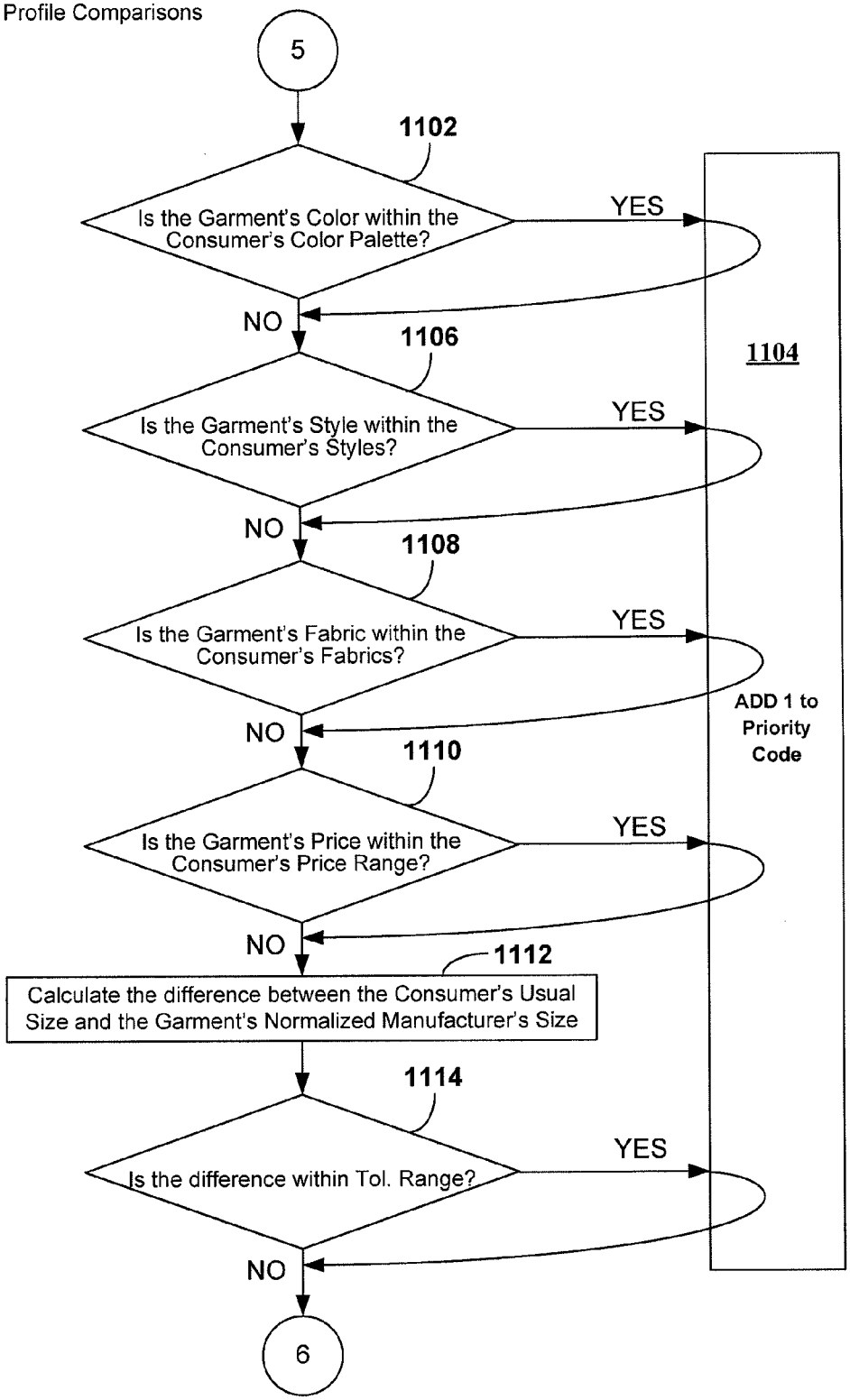

A flowchart 1100 of the profile comparison calculations is depicted in FIG. 11. Match assessment process 230 compares these four consumer and garment data points as follows. At step 1102, the first data point is whether garment color (115Dg) is contained in the array of values in the consumer's color palette (1005Dc). At step 1106, the next data point is whether the garment style (118Dg) is contained in the array of values in the consumer's desires styles (1006Dc). At step 1108, the next data point is whether garment fabric (119Dg)

is contained in the array of values in the consumer's desired fabrics (1007Dc). At step 1110, the next data point is whether garment retail price (107Dg) is less than or equal to consumer's "I usually spend" (1013Dg). If all of these match, then this garment is a match and its priority code is not changed. Otherwise, match assessment process 230 proceeds to step 1104 and adds one to the garment's priority code each time a comparison fails. In other variations, the weights assigned to each comparison might be different than one and/or vary from comparison to comparison.

Referring to data in Tables 11 and 12, the dress matches all of Jane's color, style, fabric and price preferences. Match assessment process 230 proceeds to the size comparison 1112 still having a priority code of zero.

At step 1112, match assessment process 230 compares the garment's manufacturer size (121Dg) with the consumer's usual size (1012Dc). This is an array of size values dependent on garment type. As noted above, manufacturers' sizes are notoriously variable from manufacture to manufacturer and even internally inconsistent. A manufacturer often has its own proprietary sizing scheme, e.g., "A" versus "10."So, a separate size lookup table (not shown here) is employed to normalize the garment's manufacturer size (121D) for use in the size comparison. Referring to our example data in Tables 11 and 12, the garment's manufacturer size (121Dg) is 1. The size lookup table indicates a "Smart Fashions" size 1 dress corresponds to a size 8. At step 1112, match assessment process 230 subtracts the garment's normalized manufacturer size from the consumer's usual size. If at step 1114, the difference is more than a size tolerance range of plus or minus 4, then match assessment process 230 adds one to the priority code. Steps 1112 & 1114 may be expressed by the following equation: $((1012Dc-121Dg)>\pm 4)$. In this example, Jane's usual dress size is 10 and the dress' normalized manufacture's size is 8. In other words, $((10-8)>\pm 4)$ is FALSE. So, this dress is still a perfect match and its priority code is unchanged at zero.

Fashion Suitability Comparisons

As described earlier, fashion rules and tolerances are defined in fashion suitability tables that are stored in a definitions and rules database 139c as maintained by database server 138. In one embodiment, a plurality of such tables is employed during fashion suitability comparisons. As with the other profile filter comparisons, when a garment fails any fashion suitability comparison its priority code is incremented.

Figure 12:
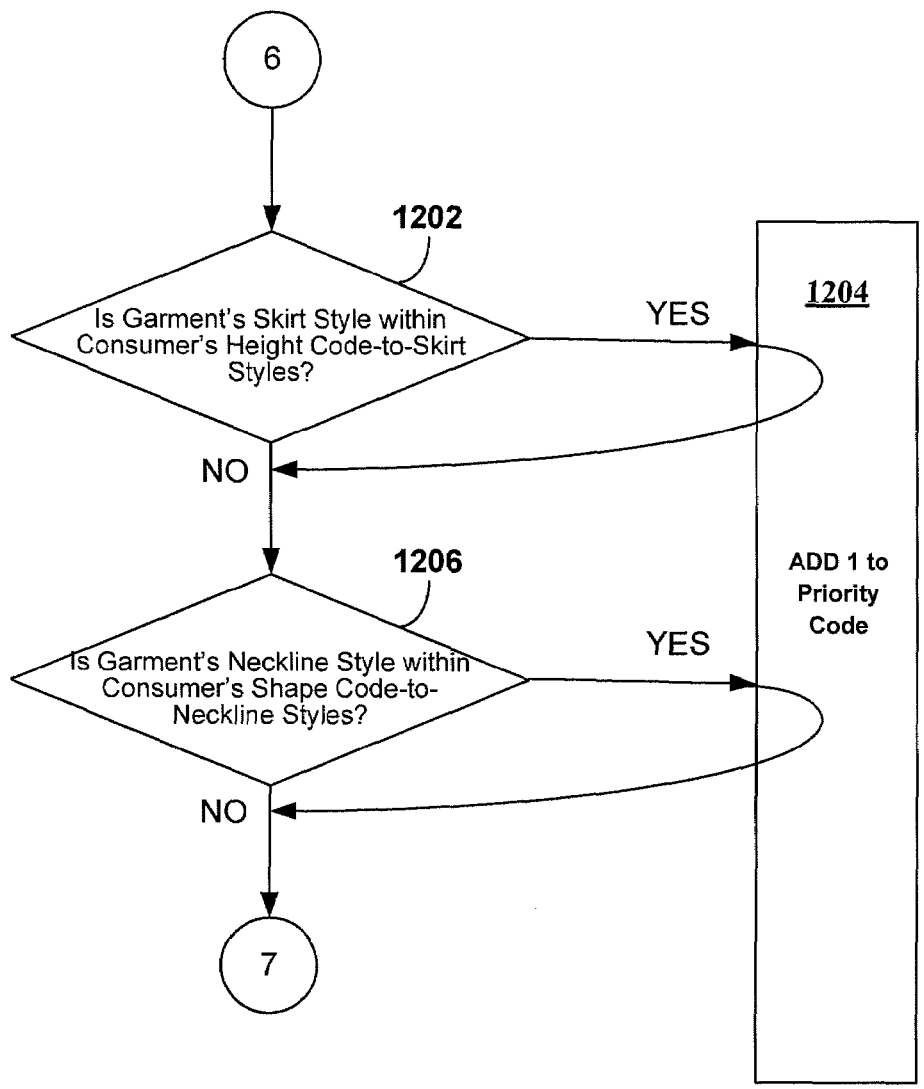

A flowchart 1200 of the fashion suitability comparison calculations is depicted in FIG. 12. In practice many fashion rules may be applied. But for the current example, two fashion suitability comparisons will be made: height code-to-shirt style and shape code-to-neckline style. Match assessment process 230 compares two consumer and garment data points as follows. At step 1202, if the garment's skirt style (114Dg) is contained in the array of suitable values for the consumer's height code (as listed in Table 6a, for example). Then, at step 1206, if garment neckline style (110Dg) is contained in the array of suitable values for the consumer's shape code (as listed in Table 7a, for example), 3) then this garment is a match and its priority code is not changed. Otherwise, match assessment process 230 proceeds to step 1204 and adds 1 to the garment's priority code each time a fashion suitability comparison fails.

Referring to data in Tables 11 and 12, Jane's height code (101Hc) is 2. The garment's skirt style (114Dg) is "A-line", or skirt style code 1. Employing the Height Code/Skirt Code Suitability Table (Table 6a), an A-line skirt is suitable for a consumer with a height code of 2. Further, Jane's shape code (100Sc) is 5. The garment's neckline style (110Dg) is "crew/jewel". Employing the Shape Code/Neckline Style Suitability Table (Table 7a), a crew neckline style is suitable for a consumer with a shape code of 5.

Thus, the dress has passed these fashion suitability comparisons with its priority code still equaling zero.

Shape Code Filter

FIG. 14 depicts holding bins 238, which form the final output of the match assessment process 230. As illustrated, there are seven holding bins, labeled 1 through 7; one for each body shape in this embodiment. In other embodiments, there may be more or fewer bins. In a specific embodiment, there are 42 bins for shape and height combinations.

Figure 13:
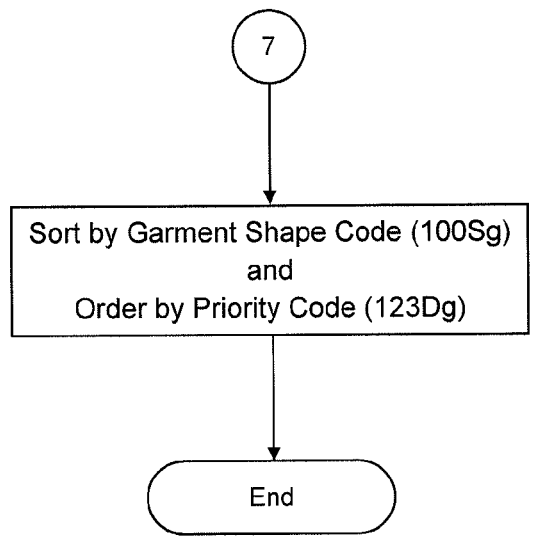

FIG. 13 depicts a shape code filter 236. Based on the garment's shape code (100Sg), the shape code filter inserts the garment (represented by its ID) and its priority code into the bin or bins corresponding to its shape code(s) as illustrated in FIG. 14. For example, a garment's shape code may be an array of numbers, e.g., 3, 5, 7. In this case the garment would be placed in bins 3, 5 and 7. The garment is inserted into the bins by ascending order of its priority code. The garments are thus segregated by shape code, and ordered from most suitable to least suitable. Garments that share a consumer's shape code and have a priority code of zero are considered "best matches". Match assessment process 230 then proceeds to a match assessment of the next garment, if any. Otherwise, the match assessment process ends with the output being a scored, ranked, sorted and filtered list of those garments which match the consumer to various degrees. This list may be used by a personalized shopping process 240 for the purpose of displaying matching garments to the consumer. Further it may be stored as a table, keyed to the consumer's record in consumer database 139a, as maintained by database server 138.

Referring to FIG. 13 and data in Tables 11 and 12, in the current example, the dress' shape code is "1, 5". So, it will be inserted into both holding bins 1 and 5. And it will be inserted at the very top of each bin, because its priority code equals zero. In Jane's personalized store, this dress may be recommended to her as a BEST match because the dress shares Jane's shape code of 5 and has a priority code of zero.

Outfits

In some embodiments, a plurality of garments may be assembled into an outfit. For example, one outfit may include three garments: a Fitted Jacket, a Straight Top and Fitted Pants. For purposes of clothes shopping system 100, an outfit may be treated as a garment. As such, an outfit has its own record in the garment database 139b. Those familiar with the state of the art will appreciate that the outfit's record may contain pointers the records of its constituent garments. Outfits are also assigned their own shape codes by combining the shape codes of their constituent garments according to an outfit categorization process. Thus outfits may also be included in a match assessment as described above. The consumer may be presented with both individual garments and outfits during the personalized shopping process.

Personalized Shopping Process personalized shopping process 240 presents a consumer with her personal online clothing store, where she may browse and purchase recommended garments that she can trust will fit and flatter her body and suit her clothing preferences.

Personal Store

In one embodiment, the consumer is presented with a personal store, which shows the customer garments, outfits and complementary accessories that match the customer's measurements, body shape, height code, personal preferences and fashion styling, that will fit her and flatter her as determined by the fashion suitability rules. Only those garments, outfits and complementary accessories that fit and flatter the consumer are displayed in her Personal Store. These items may be displayed in a plurality of modes; e.g., ranked by personal fashion preference, or price, or color, or seasonal trends, and so forth. And they may be displayed in any combination that the match assessment result allows. In another embodiment, the consumer uses a kiosk in a retail store where the selection represents what is available in inventory at that moment on the floor and the consumer may print out and shop using a recommendation/personal selection.

A consumer's personal online store is accessed through consumer module 110 of the clothes shopping system 100. For example Jane may shop at her online store by using a Web browser on her home PC. As those familiar with the art can appreciate, the online store utilizes typical and necessary ecommerce components, such as Webpage generators, order processing, tracking, shipping, billing, email, security, etc., not pictured here. Additionally, the personal store may be implemented as a freestanding website served by a server system, or as a subsection within another website, or as a web service, or within a standalone application outside of a browser environment (e.g., a "widget" or "gadget"), or in some combination of the above.

Figure 15:
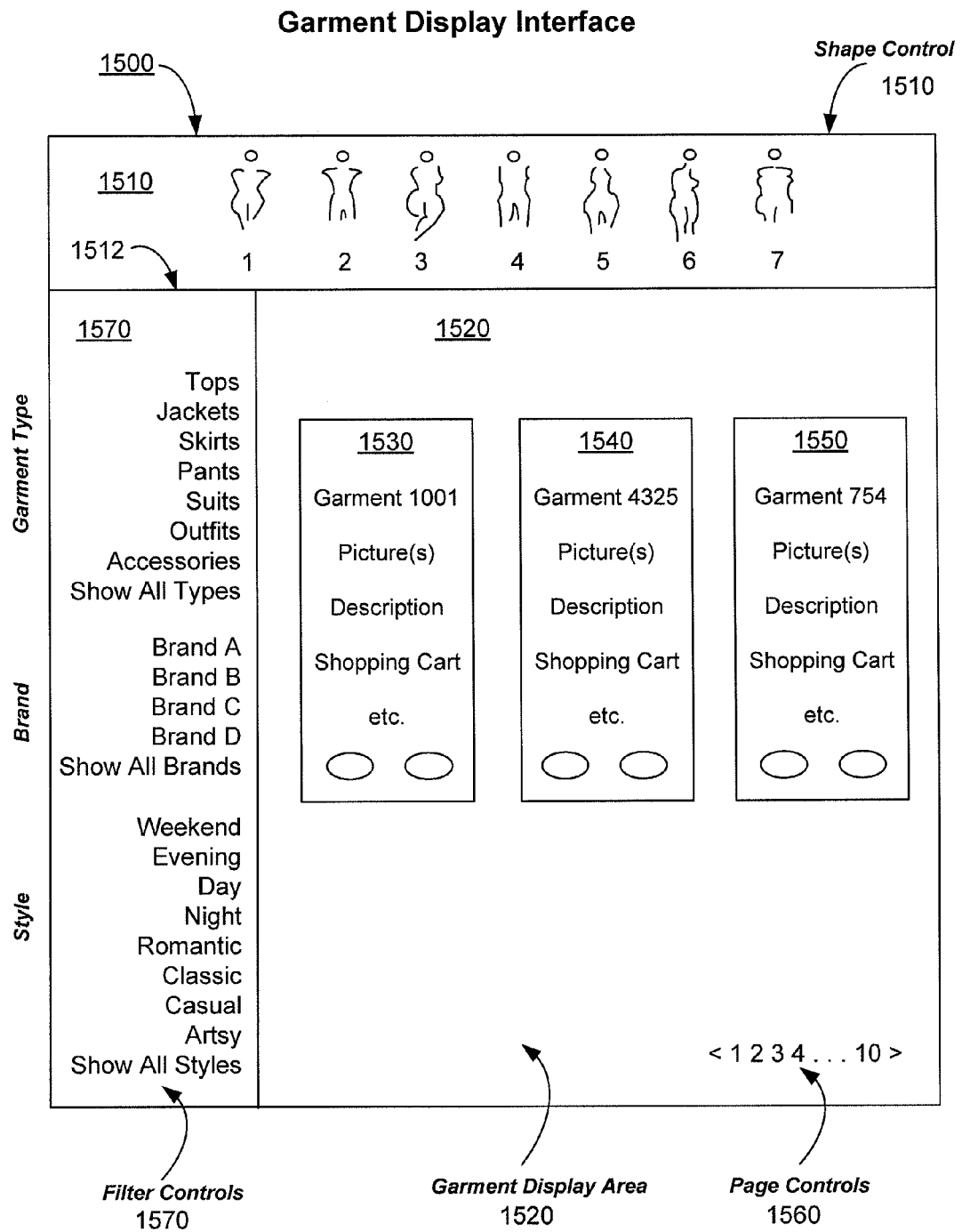
FIG. 15 is an illustration of a garment display interface, in accordance with described embodiments.

In one embodiment, the results of a match assessment 230 of multiple garments and outfits may be displayed to the consumer using a graphical user interface (GUI) 1500 as depicted in FIG. 15. Interface 1500 allows the consumer to quickly view and filter the results of a match assessment query. Based upon the contents of the match assessment holding bins 238 described earlier, the garments may be displayed in garment area 1520. In one embodiment, the priority code assigned each garment may be used to determine their order of display. For example, BEST-fit garments, those with a priority code of zero, may be displayed first.

The consumer may "page" through the garments by selecting the page controls 1560. A garment may be displayed with picture(s), descriptive text, ordering information, shopping cart buttons, etc. The results of a match assessment may also be emailed to the consumer, delivered via cellular phone, PDA, physically mailed in the form of a personalized printed catalog, or other delivery methods.

The consumer may wish to consider garments that are less-than-perfect matches for her. If so, those garments having priority codes greater than zero may then be displayed in the order of their suitability, according to priority code. In some embodiments, the garment's priority code may be displayed as a code or as an icon by the interface in order to indicate to the consumer how suitable that garment is for her. The consumer may also browse garments of different body shapes. A shape control 1510 is a row of icons/text depicting the seven body shapes of this embodiment. Clicking on a body shape icon selects that shape and the remainder of the page 1512 is updated with garments matching that body shape. When interface 1500 is first displayed, the consumer's body shape may be automatically selected and the matching garments displayed in area 1512.

The GUI might provide an icon, scale, number line, or other graphical representation of a gauge for the consumer that indicates to the consumer how well the garment fits and where with respect to the garments' tolerances, the consumer's measurements fall, thus allowing the consumer to determine how snug is snug, etc. Of course, the GUI should provide an option to allow the consumer to purchase garments that are not within prespecified preferences.

Additional filter controls 1570 may be displayed. For example, a garment type (102Dg) filter lists the various types of matching garments, such as "Dresses." A brand (106Dg) Filter lists brands and designers, such as "Smart Fashions". A style (118Dg) filter lists clothing styles, such as "Romantic." In this way, a filter could be displayed for any, or all, garment profile data points, such as color (115Dg), fabric (119Dg), sleeve style (112Dg), etc. For example, when a user selects a filter option, such as "Jackets" interface 1500 will show all matching garments that are jackets.

In other embodiments, multiple and discontinuous selections are made using a "checkbox" selection interface, as those familiar in the art will appreciate. For example, Jane may click Skirts, Pants, Brand A, Romantic, and Artsy. The garment area 1520 may then be updated with garments meeting all of those selected filter options. Thus, the personal online store can fetch, sort and display matching garments in many useful ways. And thus, the consumer may purchase one or more garments, with confidence that the garments are likely to fit and flatter her. In fact, the consumer can, with one or more click, purchase and entire outfit with multiple components.

The personal store can be shared with friends and family, indicating to them the filtered garments that fit and flatter, without needing to provide those others with fit information, size information, preferences, etc.

Personal Mall

In addition to providing the consumer with a personalized store, elements of the systems described above can be expanded to cover a personal mall, wherein filtering is done as above, but over multiple online retail outlets. The particular retail outlets that are part of the system would depend on a number of criteria and the operator of the matching system might provide that access in exchange for commissions, as well as upselling, cross-marketing and providing other useful features for the consumer. An advantage to those retailers who join the personal mall and provide a virtual storefront is reduced return rates. With proper arrangement of the personal mall, each retail outlet can present its own brand and may be the shipper that ships the products directly to the consumer.

While the invention has been described with respect to exemplary embodiments, one skilled in the art will recognize that numerous modifications are possible. For example, the processes described herein may be implemented using hardware components, software components, and/or any combination thereof Thus, although the invention has been described with respect to exemplary embodiments, it will be appreciated that the invention is intended to cover all modifications and equivalents within the scope of the following claims.

What is claimed is:

1. A computer-implemented method of presenting a filtered list of garments to an individual consumer using a computer, the method comprising:
   obtain measurements from the consumer;
   associating the consumer with a body category based on the measurements;
   reading a database of garments wherein the database includes a body categorization for at least some of the garments;
   presenting the consumer with a filtered list of garments from the database filtered to exclude at least some of garments categorized in a body category that is inconsistent with the body category of the consumer; and obtaining consumer profile details including at least one tolerance value, a tolerance value defining a range of acceptable differences between a garment measurement and a consumer measurement.

2. The method of claim 1, further comprising:

accepting consumer input of ordering information; and electronically initiating a purchase transaction wherein the consumer purchases ordered garments.

3. The method of claim 1, wherein the filtered list includes filtering by the consumer measurements to thereby provide garments that are sold in sizes compatible with the consumer measurements.

4. The method of claim 3, wherein the sizes compatible with the consumer measurements include garment sizes that have dimensional measurements within the tolerance value.

5. The method of claim 3, wherein the sizes compatible with the consumer measurements include garment sizes that have pattern measurements within the tolerance value.

6. The method of claim 1, wherein garments comprise clothing and accessories.

7. The method of claim 1, wherein the filtered list is also filtered by attributes selected by the consumer.

8. The method of claim 7, wherein the attributes include styling choices selected by the consumer and personal preferences selected by the consumer.

9. The method of claim 7, wherein the attributes comprise at least one clothing fit tolerance, or clothing designer tolerance, or color tolerance, or clothing style tolerance, or clothing material tolerance, or use tolerance, or country of garment origin, or garment care, or garment brand.

10. The method of claim 1, wherein the consumer profile details comprise a plurality of tolerance values and at least two of the tolerance values are specific to different garment styles such that different garment styles are filtered based on different tolerance values.

11. The method of claim 1, wherein the body category is a category based on body proportion.

12. The method of claim 11, wherein the body proportion is a proportion of a top body measurement to a bottom body measurement.

* * * * *